United States Patent
Okamura

(10) Patent No.: US 11,192,026 B2
(45) Date of Patent: Dec. 7, 2021

(54) GAME APPARATUS AND PROGRAM

(71) Applicant: KONAMI DIGITAL ENTERTAINMENT CO., LTD., Tokyo (JP)

(72) Inventor: Noriaki Okamura, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 0 days.

(21) Appl. No.: 16/507,825

(22) Filed: Jul. 10, 2019

(65) Prior Publication Data

US 2019/0329133 A1    Oct. 31, 2019

Related U.S. Application Data

(63) Continuation of application No. PCT/JP2018/000207, filed on Jan. 9, 2018.

(30) Foreign Application Priority Data

Jan. 12, 2017    (JP) .............. JP2017-003337

(51) Int. Cl.
*A63F 13/52*    (2014.01)
*G06T 15/20*    (2011.01)

(52) U.S. Cl.
CPC .............. *A63F 13/52* (2014.09); *G06T 15/20* (2013.01); *G06T 2210/62* (2013.01)

(58) Field of Classification Search
CPC .............. A63F 13/52; A63F 2300/6653; G06T 2210/62; G06T 19/00; G06F 3/0481
See application file for complete search history.

(56) References Cited

U.S. PATENT DOCUMENTS

| 6,377,277 | B1 | 4/2002 | Yamamoto |
| 7,101,283 | B2 * | 9/2006 | Okamoto .............. A63F 13/10 |
| | | | 463/30 |

(Continued)

FOREIGN PATENT DOCUMENTS

| EP | 1 350 545 A2 | 8/2003 |
| JP | 9-50541 A | 2/1997 |

(Continued)

OTHER PUBLICATIONS

Machine Translation of Japanese Patent Application 9-50541 issued Feb. 18, 1997.

(Continued)

*Primary Examiner* — Seng H Lim
(74) *Attorney, Agent, or Firm* — Sughrue Mion, PLLC

(57) ABSTRACT

A game apparatus includes a position acquisition device configured to acquire information related to a position of a second object movable in a game field in which a first object is disposed and in a three-dimensional virtual space, and an image generation device configured to generate an image representing a view from a virtual viewpoint in the three-dimensional virtual space, and perform an image change by at least one of erasure and transparentization of the first object on the basis of a height of the first object with respect to the position of the second object in a display area including at least a part of the second object when generating the image.

14 Claims, 17 Drawing Sheets

(56) References Cited

U.S. PATENT DOCUMENTS

| | | | | |
|---|---|---|---|---|
| 8,602,888 | B2* | 12/2013 | Kaneko | A63F 13/10 463/32 |
| 2001/0049300 | A1* | 12/2001 | Okamoto | A63F 13/525 463/30 |
| 2003/0166413 | A1 | 9/2003 | Hayashida et al. | |

FOREIGN PATENT DOCUMENTS

| | | |
|---|---|---|
| JP | 2002-45566 A | 2/2002 |
| JP | 2003-181136 A | 7/2003 |
| JP | 2003-290550 A | 10/2003 |
| JP | 2005-100109 A | 4/2005 |
| JP | 2007-58866 A | 3/2007 |
| JP | 4313810 B2 | 8/2009 |
| JP | 2012-174089 A | 9/2012 |

OTHER PUBLICATIONS

Machine Translation of Japanese Patent Application No. 2002-45566 issued Feb. 12, 2002.
Machine Translation of Japanese Patent Application No. 2005-100109 issued Apr. 14, 2005.
Machine Translation of Japanese Patent Application No. 2003-290550 issued Oct. 14, 2003.
Written Opinion dated Feb. 6, 2018, by the International Patent Office in application No. PCT/JP2018/000207.
Communication dated Mar. 6, 2018 by the Japanese Patent Office in application No. 2017-003337.
Communication dated Dec. 22, 2017 by the Japanese Patent Office in application No. 2017-003337.
Communication dated Jun. 11, 2019 by the Japanese Patent Office in application No. 2017-003337.
Communication dated Sep. 24, 2019 from Japanese Patent Office in counterpart JP Application No. 2017-003337.
International Search Report for PCT/JP2018/000207 dated Feb. 6, 2018 (PCT/ISA/210).
Communication dated Jan. 14, 2021 from the Korean Intellectual Property Office in Application No. 10-2019-7020325.

* cited by examiner

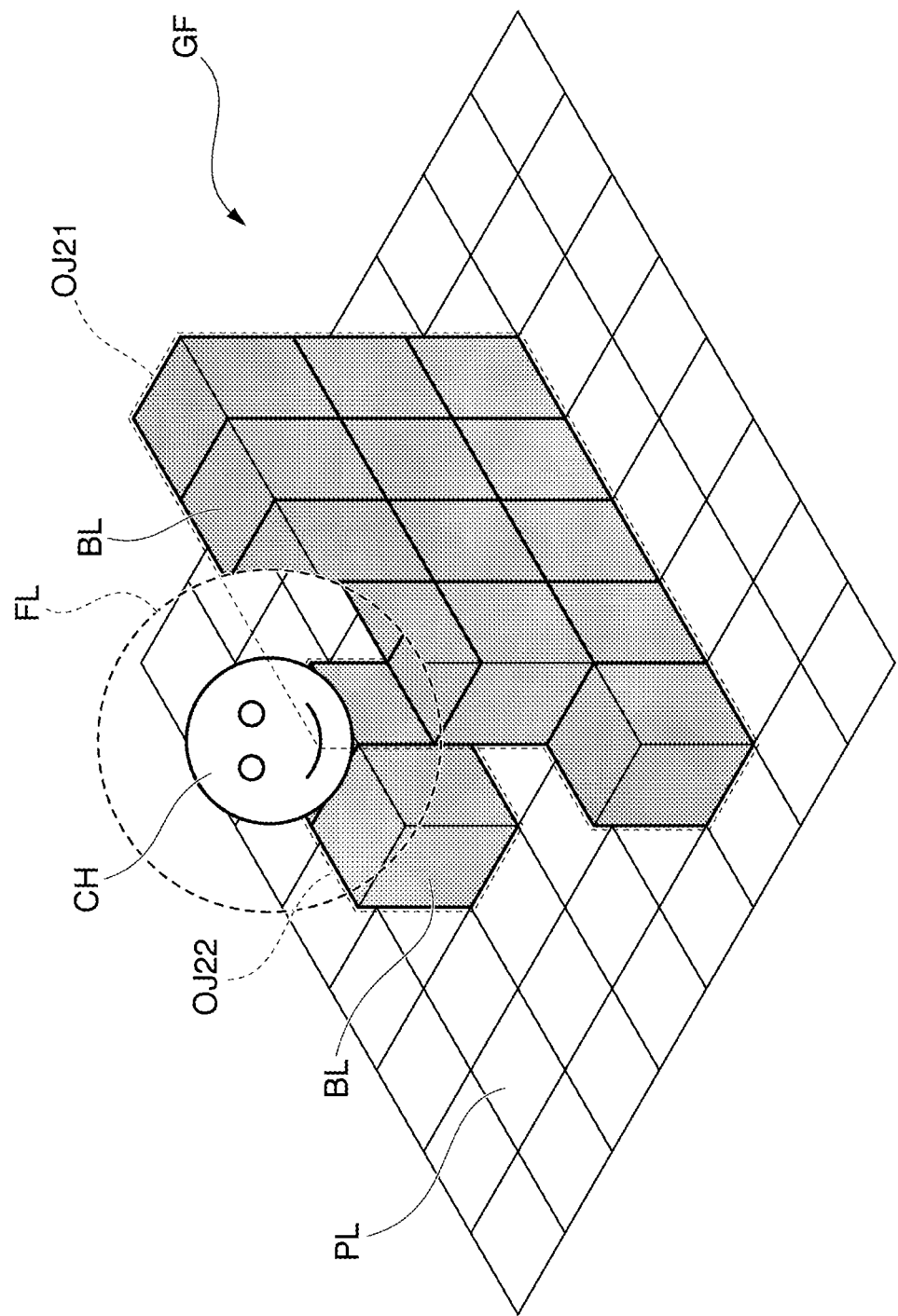

GAME APPARATUS AND PROGRAM

TECHNICAL FIELD

The present invention relates to a game apparatus and a program.

BACKGROUND ART

A game for operating a character in a three-dimensional virtual space is known. In such a game, an image that appears to be observed from a virtually set viewpoint (virtual viewpoint) in a three-dimensional virtual space is displayed on a game screen.

In the game screen of such a game, in case that an object is present between the character and the virtual viewpoint, the character is blocked by the object and is not be seen. In such a state, it is difficult for a user to ascertain a situation of the character in the three-dimensional virtual space, and the operability is impaired.

There is known, for example, a technique that if an object such as an obstacle is present between a virtual viewpoint and a character, then the character is caused to be seen by performing a transparentization process on the object. This is disclosed in Patent Literature 1),

CITATION LIST

Patent Literature

[Patent Literature 1]
Japanese Unexamined Patent Application, First Publication No. H09-50541

SUMMARY OF INVENTION

Technical Problem

However, in a case that the transparentization process is performed on the object as described above, the following issues may occur in some cases.

That is, the character moves in the three-dimensional virtual space in accordance with the operation of the user. On the other hand, the object that is present in the three-dimensional virtual space often restricts the movement of the character as, for example, an obstacle.

The transparentization process of the object described above does not remove the presence itself of the object in the three-dimensional virtual space, but is for the purpose of causing the object not to be seen for the sake of convenience although the object is present.

Therefore, for example, the user tends to perform an operation of moving the character to a position of the object on which the transparentization process is performed. In this case, the movement of the character is restricted by the object that is not seen, and the operability is significantly impaired.

Therefore, an object of some aspects of the present invention is to provide a game apparatus and a program enabling a user to ascertain a positional relationship between another object and a specific object in a state in which the user is enabled to observe the specific object in a case in which the specific object is blocked by the other object in a three-dimensional virtual space.

In addition, one object of another aspect of the present invention is to provide a game apparatus and a program capable of achieving the advantageous effects described in the embodiments which will be described later.

Solution to Issues

According to one aspect of the present invention for solving the problems described above, a game apparatus includes a position acquisition device configured to acquire information related to a position of a second object movable in a game field in which a first object is disposed and in a three-dimensional virtual space, and an image generation device configured to generate an image representing a view from a virtual viewpoint in the three-dimensional virtual space. When the image generation device generates the image, in a display area including at least a part of the second object, the image generation device performs an image change by at least one of erasure and transparentization of the first object on the basis of a height of the first object with respect to the position of the second object.

In addition, according to one aspect of the present invention, a game apparatus includes an image generation device configured to generate an image representing a view from a virtual viewpoint in a three-dimensional virtual space having a game field in which a first object is disposed. The image generation device performs an image change by at least one of erasure and transparentization of the first object on the basis of a height of the first object in the three-dimensional virtual space, in a display area including at least a part of the second object movable in a game field.

In addition, according to one aspect of the present invention, a game apparatus includes a position acquisition device configured to acquire information related to a position of a second object movable in a game field in which a first object is disposed in a three-dimensional virtual space, and an image generation device configured to generate an image representing a view from a virtual viewpoint in the three-dimensional virtual space. The image generation device divides the first object into a first object of a high position higher than a boundary height set on the basis of a position of the second object and a first object of a low position lower than the first object of the high position, and causes a degree of emphasizing and displaying the first object of the low position with respect to the first object of the high position to be higher in a first display area including at least a part of the second object than in a second display area different from the first display area.

In addition, according to one aspect of the present invention, a program causes a computer to function as each of the game apparatuses described above.

BRIEF DESCRIPTION OF DRAWINGS

FIG. 6 is a diagram showing an aspect example of the image change in the image change area in the first embodiment.

DESCRIPTION OF EMBODIMENTS

Hereinafter, embodiments of the present invention will be described with reference to the drawings.

First Embodiment

[Overview]

A game played by a game apparatus of the present embodiment is a game in which a character operated by a user is moved in a game field by a three-dimensional virtual space.

Figure 1:
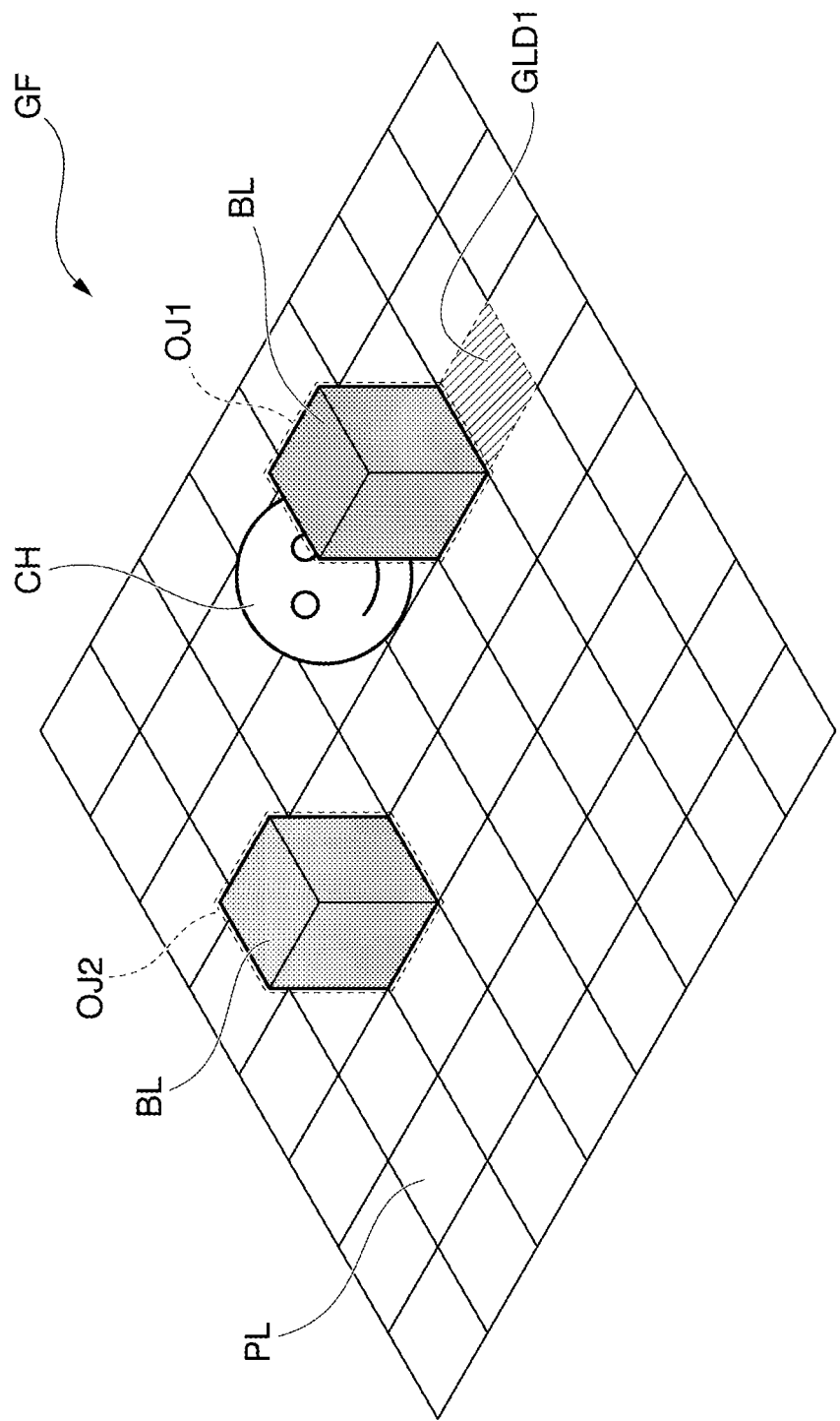
FIG. 1 is a diagram showing an example of a positional relationship between an object and a character in a game field displayed on a game screen.

FIG. 1 shows an example of a game field GF displayed on a game screen in the present embodiment. The game screen of the present embodiment shows a state in which the game field GF is seen from a predetermined virtual viewpoint. This virtual viewpoint is set in a three-dimensional virtual space including the game field GF of the figure. Note that the virtual viewpoint set in the present embodiment may be changed as appropriate, but in the following, a case in which the virtual viewpoint is fixedly set at a fixed position will be described as an example in order to simplify the description.

In the game field GF in the figure, a character CH (an example of a second object) moves in accordance with an operation of the user. A reference surface PL is set in the game field GF of the present embodiment. An object OJ is disposed on the reference surface PL. The character CH moves in a space on the reference surface PL in the game field GF.

In addition, one or a plurality of objects (an example of a first object) are appropriately disposed on the reference surface PL. At least one object of the one or plurality of objects is, for example, an object that is an obstacle to the movement of the character CH. In the figure, an example in which objects OJ1 and OJ2 are appropriately disposed is shown.

Note that, in the following description, "n" in OJn (n is an integer which is assigned in accordance with each object) is omitted and each of the objects is referred to as an object OJ unless the objects are specially distinguished from each other.

In addition, the object OJ of the present embodiment is formed by one block BL or a set of a plurality of blocks BL. One block BL is a block of a size and a shape that are determined in advance. However, at least one block may be different in a size or a shape from another block BL. In the figure, a case in which all the blocks BL are cubes will be described as an example.

According to the dispositions of the objects in devices of such blocks BL, a grid according to a size of a surface of one block BL is set in the reference surface PL. When one block BL is disposed on the reference surface PL, a bottom surface of the block BL is disposed so as to fit in the grid of the reference surface PL.

As described above, the object OJ in the present embodiment is an object that functions as an obstacle to the movement of the character CH, and corresponds to, for example, a wall, a building, a rock, a plant, a vehicle, or the like. That is, the object OJ affects the movement of the character CH.

For example, in a case in which the user moves the character CH from a position shown in the figure to a position of a grid GLD1 between which the object OJ1 is interposed, the character CH is not able to be moved to the position of the object OJ1 even though the character is attempted to be moved straight in a direction of the grid GLD1.

In this case, the user needs to move the character CH so as to bypass the object OJ1 on the reference surface PL to cause the character to reach the grid GLD1. Alternatively, in a case in which it is permitted to climb over the object OJ in the game, the user may move the character CH once so that the character CH climbs the object OJ1, and then may lower the character CH from the object OJ1 so as to move the character CH to the position of the grid GLD1.

In a case of the figure, for example, the object OJ1 is formed by one block BL. Since the object OJ1 has the same degree to the character CH or is smaller than the character CH, as shown in the figure, even in a case in which the character CH is positioned on a rear side of the object OJ1 as viewed from the virtual viewpoint (the rear side as viewed from the virtual viewpoint is also simply referred to as "rear"), all of the character CH is not always invisible.

Figure 2:
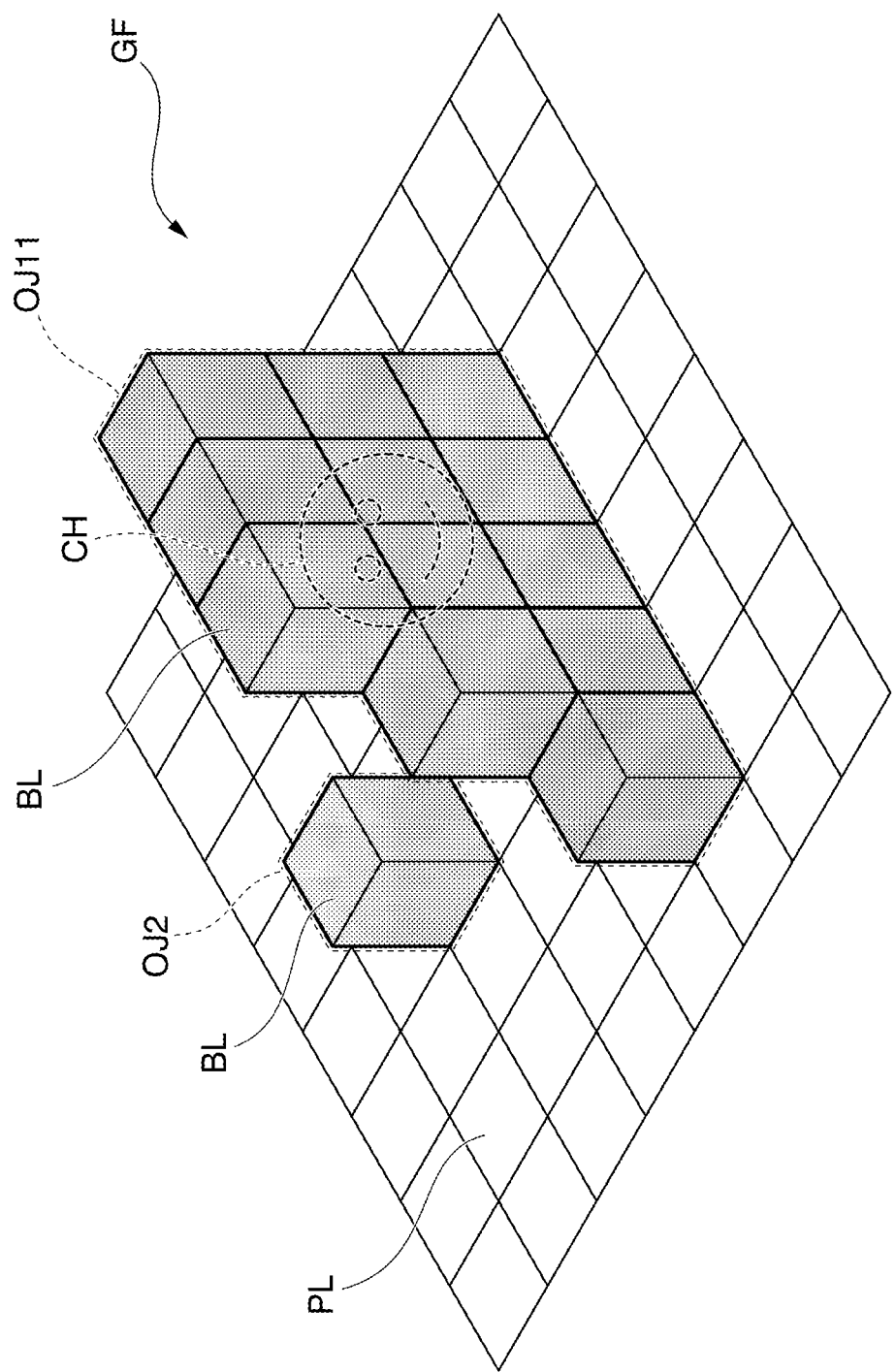
FIG. 2 is a diagram showing an example of the positional relationship between the object and the character in the game field displayed on the game screen.

However, in FIG. 2, instead of the object OJ1 of FIG. 1, an object OJ11 formed by a large number of blocks BL is disposed. In such a situation, an appearance of the character CH is blocked by the object OJ11. In such a situation, the character CH that is an operation target is hidden at the rear of the object OJ11 and is not seen by the user. Therefore, it becomes difficult for the user to ascertain a result of the movement of the character CH according to the operation.

That is, the game of the present embodiment is a game in which the character CH is operated and moved in the game field GF in which the object OJ is disposed. In such a game, the operability of the user is significantly impaired due to the block of the character CH by the object OJ. Therefore, in the present embodiment, the game apparatus favorably maintains the operability of the user even in a situation in which the character CH is blocked by the object OJ as follows.

Figure 3:
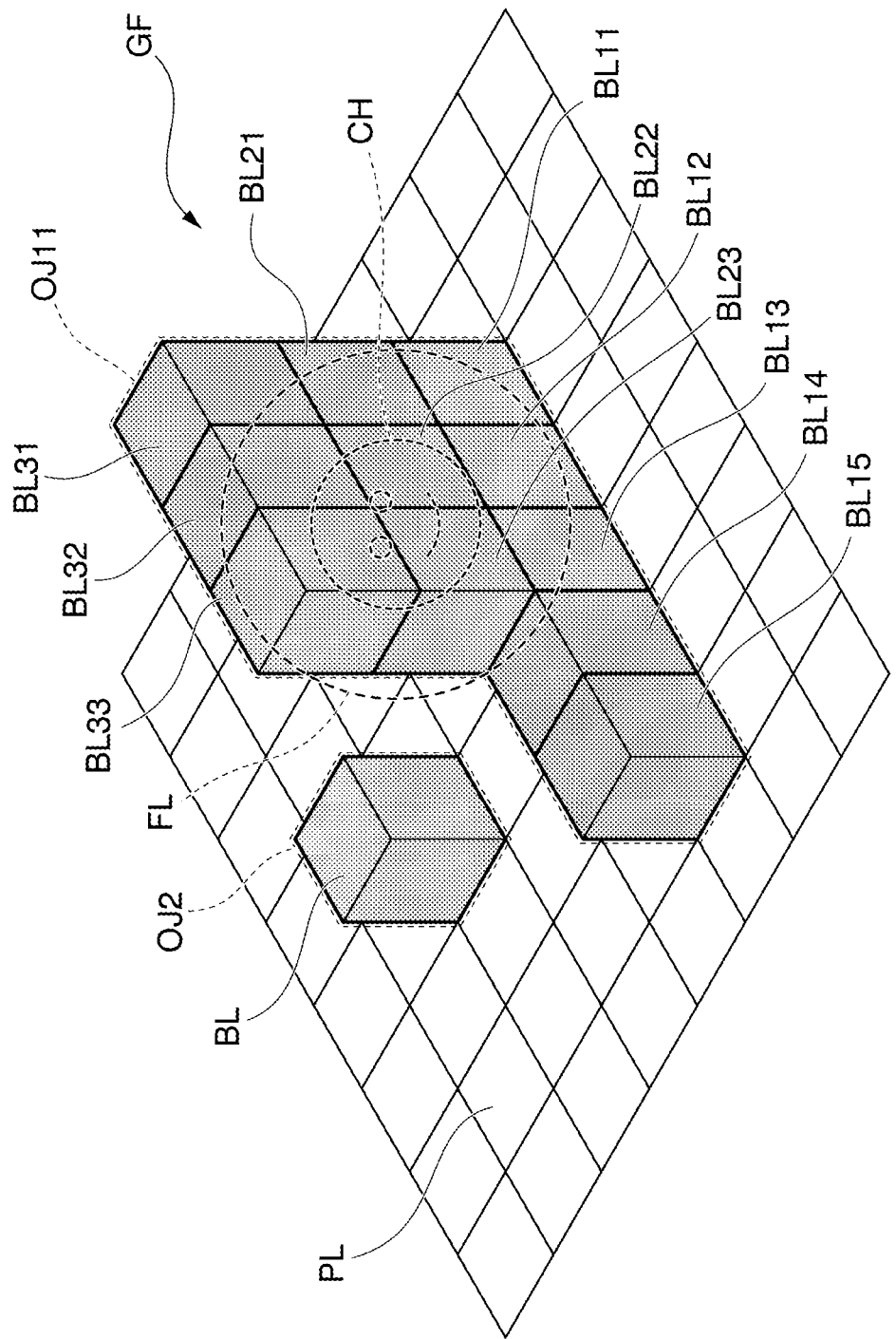
FIG. 3 is a diagram for describing setting of an image change area in a first embodiment.

That is, in the present embodiment, as shown in FIG. 3, the game apparatus sets an image change area FL (an example of a display area including at least a part of the second object) including the character CH by using a predetermined position set corresponding to the position of the character CH as a reference position. For example, the reference position may be a position (for example, a center position) determined in advance inside the character CH. In addition, in the present embodiment, an example in which a range indicated by a sphere of a constant radius centered on the reference position is set as the image change area FL is shown.

In addition, in the present embodiment, the game apparatus causes the following display change to be given in the image change area FL.

First, as shown in FIG. 3, in the lowermost stage (a first stage from the bottom), blocks BL11 to BL15 are arranged in line, in the upper stage thereof (a second stage from the bottom), blocks BL21 to BL23 are disposed at upper positions of the blocks BL11 to BL13, respectively, and in the upper stage thereof (a third stage from the bottom), blocks BL31 to BL33 are disposed at upper positions of the blocks BL21 to BL23, respectively, and thus the object OJ11 is formed. Note that, in the following description, these blocks will be referred to as a block BL unless the blocks are not specially distinguished from each other.

The character CH is positioned on the reference surface PL at the rear of the object OJ11. According to a positional relationship between the object OJ11 and the character CH, a part of the object OJ11 is included in the image change area FL as follows. That is, at least a part of each of the blocks BL11, BL12, BL13, and BL14 of the first stage from the bottom, the blocks BL21, BL22, and BL23 of the second stage from the bottom, and the blocks BL31, BL32, and BL33 of the third stage from the bottom is included in the image change area FL.

Figure 4:
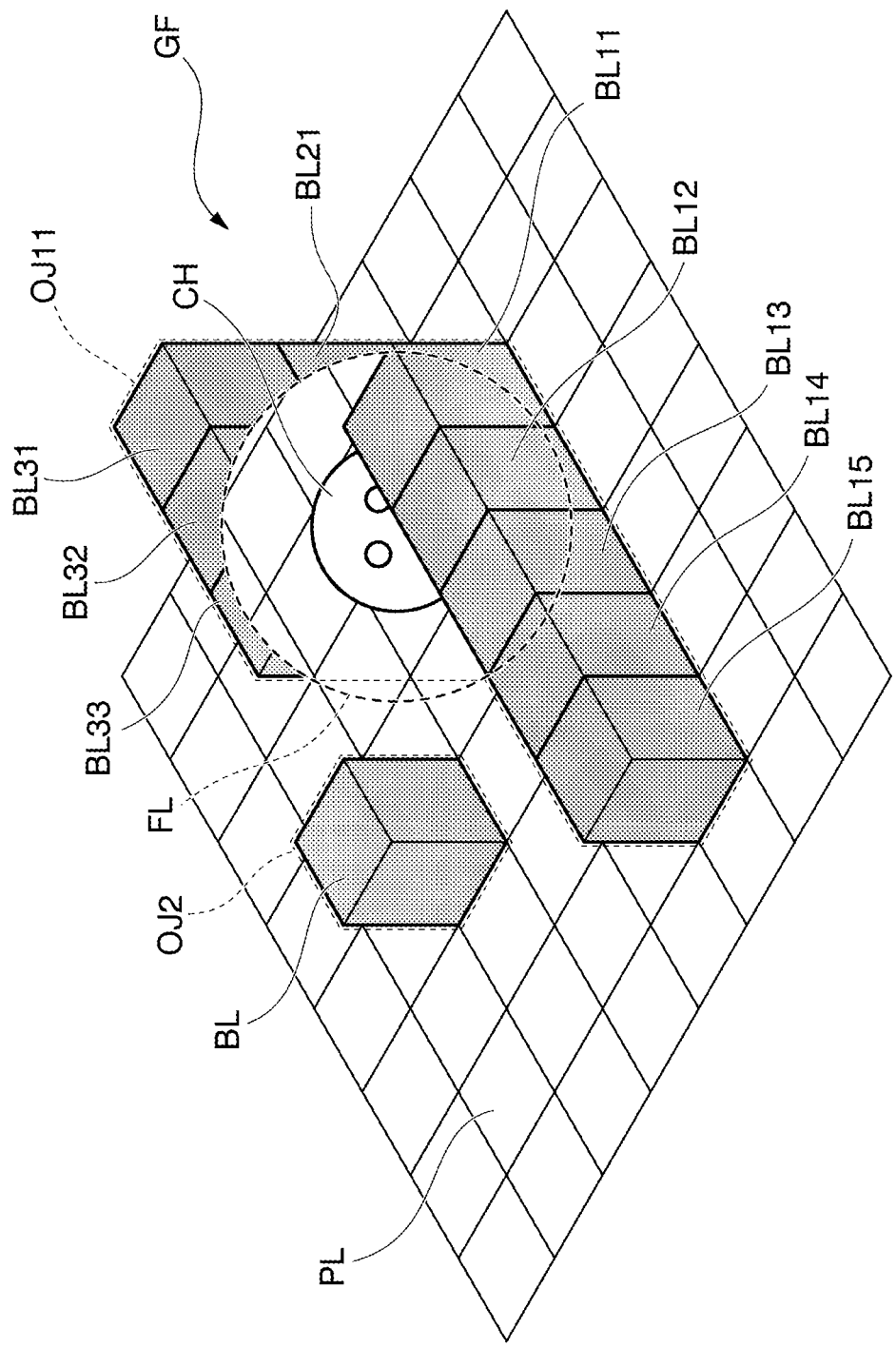
FIG. 4 is a diagram showing an aspect example of an image change in the image change area in the first embodiment.

In addition, in the present embodiment, the game apparatus gives a display change as shown in FIG. 4 from a state (disposition) of FIG. 3 to the image change area FL including a part of the object OJ11 as described above. That is, the game apparatus erases a portion of the block BL included in the image change area FL in the blocks of the second and third stages from the bottom, and does not erase and leaves the block of the first stage from the bottom that is present at the same height as that of the character CH even though the block of the first stage from the bottom is included in the image change area FL.

As a result, for example, as shown in the figure, a part of the blocks BL32 and BL33 included in the image change area FL is erased (removed) in the third stage from the bottom, and a part of the block BL21 included in the image change region FL in the second stage from the bottom and all of the blocks BL22 and BL23 are erased. Since the block BL is erased as described above, as shown in the figure, in the erased portion, the image is displayed so that the rear image is seen as it is.

On the other hand, although the blocks BL11 to BL14 of the first stage from the bottom are included in the image change area FL, the blocks BL11 to BL14 are displayed in a state in which the blocks BL11 to BL14 are not erased and are remained.

As shown in the figure, the game apparatus is able to cause the character CH to be seen even in a case in which the character CH is positioned at the rear of the object OJ11 by giving the display change in the image change area FL. Furthermore, the game apparatus performs display such that the block BL of the first stage from the bottom are not erased and remained. Therefore, the user is also able to simultaneously ascertain that the block BL is present having the same height as that of the character CH as a part of the object OJ11. That is, the user is able to confirm the character CH blocked by the object OJ11. In addition, in practice, the object OJ11 is positioned in front of the character CH as viewed from the virtual viewpoint (forward: the front side as viewed from the virtual viewpoint is also simply referred to as "front"). Since the game apparatus leaves and displays a portion of the object OJ11 (the blocks BL11 to BL15 that are present at the same height as that of the character CH), the user is able to accurately ascertain that the character CH is not able to be moved to the front side. As a result, in the present embodiment, the game apparatus is able to improve the operability of the user under the situation in which the character CH is present at the position blocked by the object OJ.

In addition, in the game of the present embodiment, the user is able to move the character CH so that the character CH is on the object OJ by operating the game apparatus as an aspect of the movement of the character CH in the game field GF.

Figure 5:
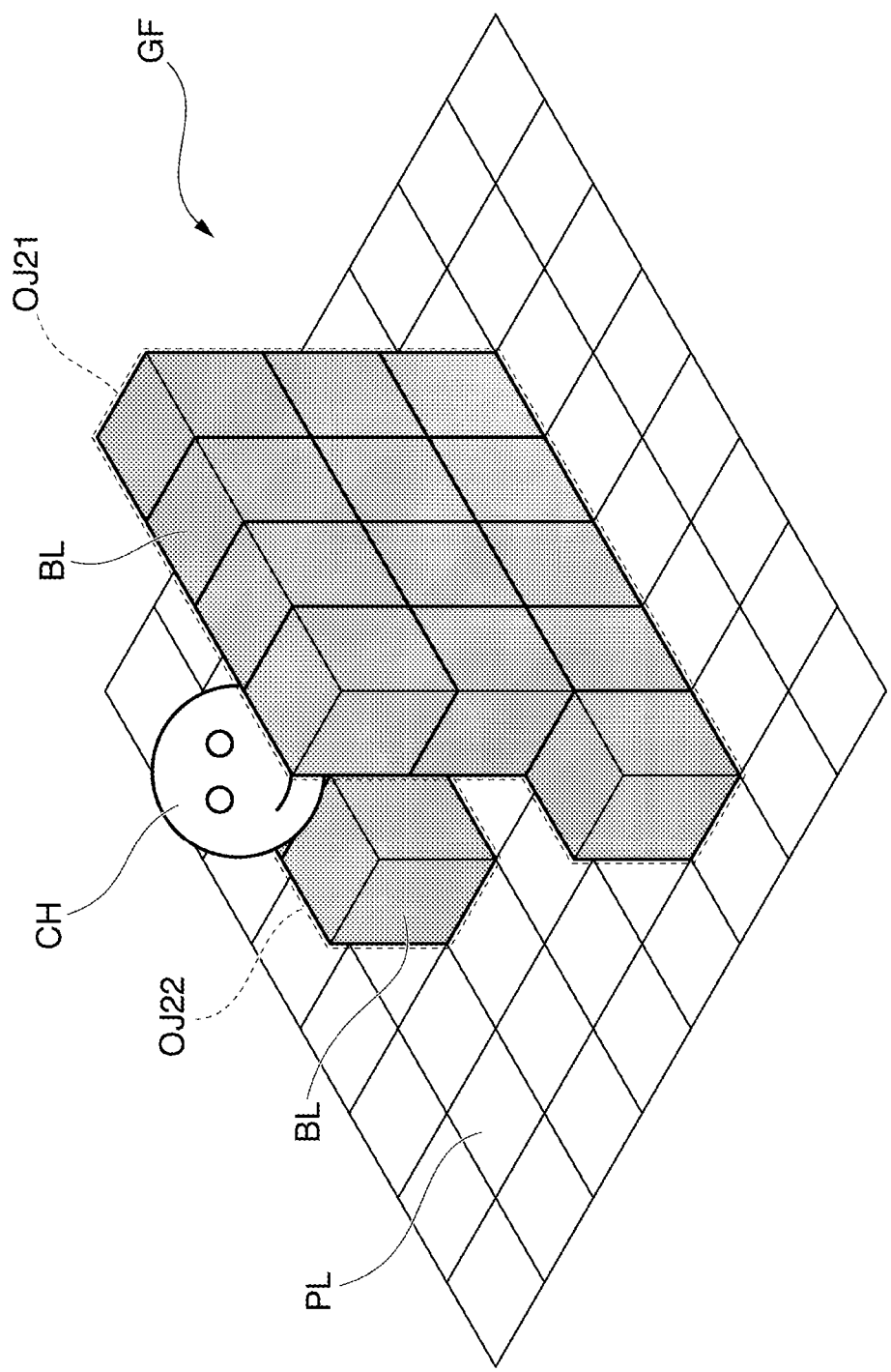
FIG. 5 is a diagram showing an example of the positional relationship between the object and the character in the game field displayed on the game screen.

FIG. 5 shows an example of a state in which the character CH is on the object OJ. Specifically, in the figure, an object OJ22 is formed by arranging two blocks BL in line in the first stage from the bottom. In the figure, in the object OJ22, a state in which the character CH is on one block BL is shown. In addition, in the figure, an object OJ21 is disposed in front of the character CH. The object OJ21 is formed by stacking the blocks BL of three stages with respect to the reference surface PL as shown in the figure.

FIG. 6 shows an example of the display change of the image change area FL. The game apparatus gives a display change as shown in FIG. 6 under a state (disposition) originally shown in FIG. 5 to the image change area FL. As shown in the figure, the game apparatus erases a portion of the block BL of the third stage from the bottom among the portions of the block BL of the object OJ21 included in the image change area FL, and does not erase and leaves portions of the blocks BL of the second stage from the bottom and the second stage from the bottom.

That is, in a case of the figure, the position of the character CH is above the block BL disposed at the first stage from the bottom in a height direction, and is higher by one stage of the block BL1 in comparison with the case of FIG. 4. Therefore, in this case, the game apparatus does not erase, leaves, and displays a portion of the block BL up to the second stage from the bottom corresponding to the same height as the character CH among the blocks BL of the object OJ21 included in the image change area FL. The game apparatus erases a portion of the block BL corresponding to the third stage from the bottom as the block BL higher than the character CH.

As described above, a situation is made in which in a case in which the character CH is positioned at the height corresponding to the block BL of the second stage from the bottom, as the block BL affecting the movement of the character CH, the block BL of the second stage from the bottom is noticed by the user. Therefore, as shown in the figure, in a case in which the game apparatus gives the display change in the image change area FL, first, the game apparatus is able to cause the character CH positioned at the height corresponding to the block BL of the second stage from the bottom to be seen from the user. In addition, at the same height as the character CH, the user is also able to ascertain the presence of the object OJ that inhibits the movement of the character in front.

Figure 7A:
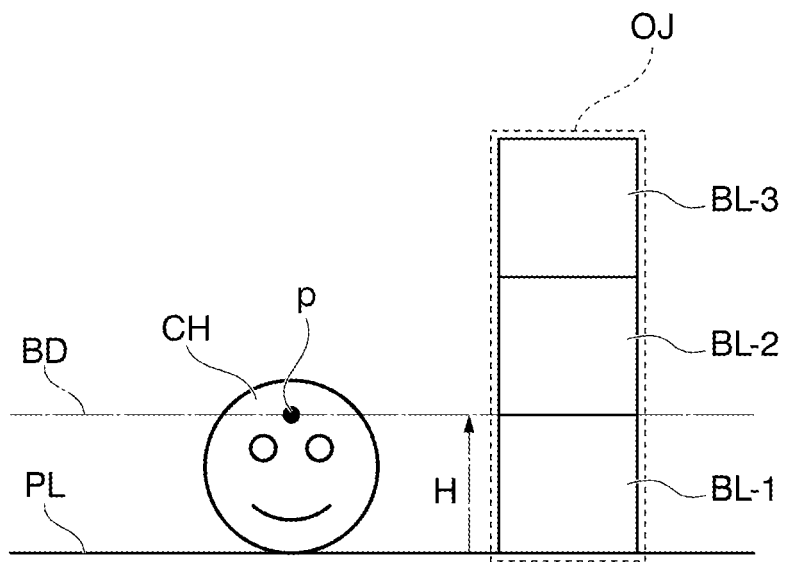
FIG. 7A is a diagram for describing an example of a method of setting a boundary designation surface in the first embodiment.
Figure 7B:
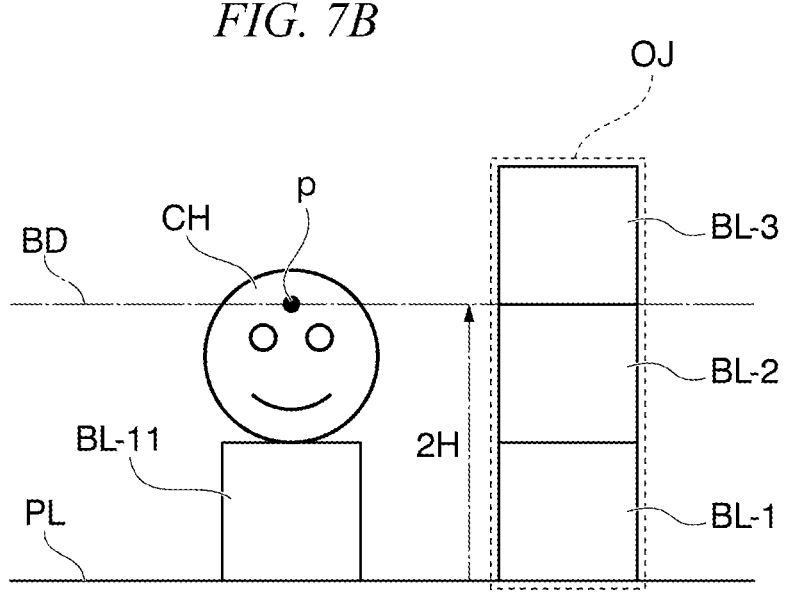
FIG. 7B is a diagram for describing another example of the method of setting the boundary designation surface in the first embodiment.

Here, an example of a boundary setting between a portion that is to be erased and a portion that is not to be erased in the object OJ will be described with reference to FIGS. 7A and 7B. FIGS. 7A and 7B will be described in correspondence with the display change of the image change area FL shown in FIGS. 4 and 6. The game apparatus is able to perform setting, for example, as follows.

FIG. 7A shows a state in which the character CH is positioned directly on the reference surface PL. The position in the height direction of the character CH in the figure corresponds to the state of FIG. 4. In addition, in the figure, the object OJ is disposed. The object OJ is formed by stacking the blocks BL (BL-1, BL-2, BL-3) of three stages from the bottom to the top.

In the present embodiment, the game apparatus sets a position corresponding to the height (block height) H by one block BL from the lowermost position in an image of the character CH as a boundary corresponding position p. In addition, a plane including the boundary corresponding position p is set as a boundary designation surface BD.

In a state of the figure, the boundary designation plane BD is a plane parallel to the reference surface PL and at a distance of the height H from the reference surface PL by one block. As described above, in the present embodiment, the reference surface PL is a surface that is to be a reference in defining the height direction. That is, in the present embodiment, a vertical direction (normal direction) of the reference surface PL is defined as the height direction. Note that, with respect to the height direction, for example, a gravity direction in the three-dimensional virtual space may be defined as the height direction besides being based on a specific surface such as the reference surface PL (as shown in the figure, a direction in which gravity is directed is a direction in which the height is low, and a direction opposite thereto is a direction in which the height is high). In the following description, a case in which the vertical direction of the reference surface PL is the height direction as shown in the figure will be described as an example.

In addition, FIG. 7B shows a state in which the character CH is positioned above the block BL-11. The block BL-11 is placed on the reference surface PL. In this case, the boundary corresponding position p set in the image of the character CH matches a height from the reference surface PL to an upper surface of the two blocks BL2. The game apparatus sets a position corresponding to the height (block height) 2H of the two blocks BL from the reference surface PL as the boundary corresponding position p. That is, in this case, the boundary designation surface BD is set as the height (2H) from the reference surface PL to an upper surface of the two blocks BL2.

In addition, in the present embodiment, the game apparatus erases the portion of the block BL above the boundary designation surface BD that is set according to the position of the character CH in the height direction as described above, and does not erase the portion of the block BD below the boundary designation surface BD, among the portions of the block BL of the object OJ included in the image change area FL.

Note that, according to the method of setting the boundary designation surface BD in the figure, among the objects OJ included in the image change area FL, the object OJ above the boundary designation surface BD may be a target of the image change and may be erased regardless of whether the object OJ is set in front of or the rear of the character CH (rear from the viewpoint).

However, the object OJ positioned at the rear of the character CH does not interrupt the user from viewing the character CH. In this point, it can be said that the operation of the character CH will not be disturbed even in a case in which the image change of the portion above the boundary designation surface BD is not intentionally performed on the object OJ positioned at the rear of the character CH.

Therefore, even in a case in which the object OJ is included in the image change area FL, the object OJ positioned at the rear of the character CH may be displayed as it is without setting the target of the image change.

[Constitution Example of Game Apparatus]

Figure 8:
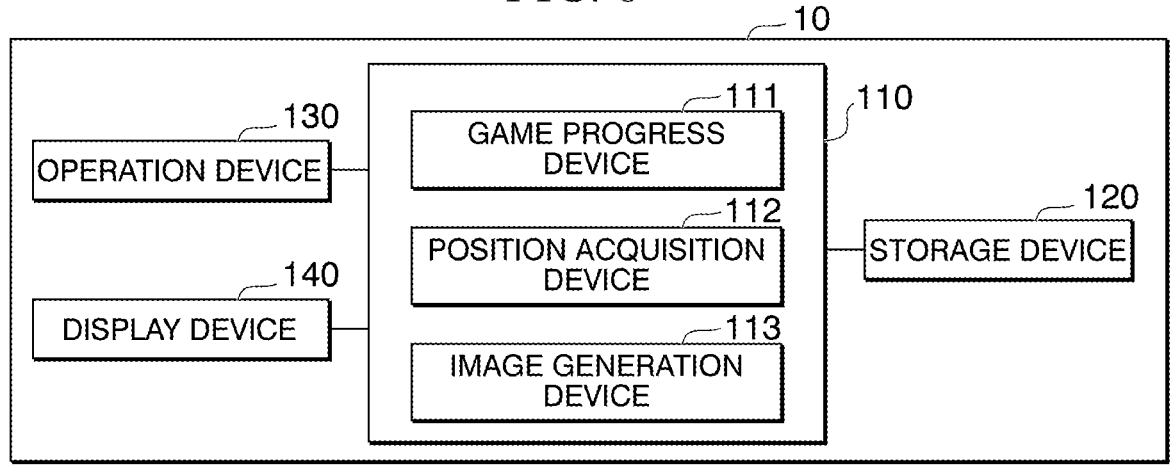
FIG. 8 is a diagram showing a constitution example of a game apparatus in the first embodiment.

FIG. 8 shows a constitution example of the game apparatus 10 in the present embodiment. The game apparatus 10 of the figure includes a game control device 110, a storage device 120, an operation device 130, and a display device 140.

The game control device 110 performs control related to progress of the game of the present embodiment. A function as the game control device 110 is realized by execution of a program by a central processing unit (CPU) included in the game apparatus 10. The game control device 110 in the figure includes a game progress device 111, a position acquisition device 112, and an image generation device 113.

The game progress device 111 executes the control related to the progress of the game of the present embodiment. For example, the game progress device 111 executes control or the like for moving the position of the character in the game field GF in accordance with the performance of the operation for moving the character CH in the game field GF as the operation for the operation device 130. In addition, in the progress of the game, in a case in which a predetermined purpose in the game is achieved, the game progress device 111 performs assignment or the like of a score or the like according to an achieved content.

The position acquisition device 112 acquires information related to the position of the character CH in the game field GF. Here, the information related to the position includes, for example, information on a position in a plane direction along the reference surface PL in the game field GF, information on a position in the vertical direction (height direction) of the reference surface PL, and the like.

The image generation device 113 generates the image of the game field GF (an example of the image representing the view from the virtual viewpoint in the three-dimensional virtual space).

In addition, when the image generation device 113 generates the image, the image generation device 113 according to the present embodiment performs the image change for erasing at least a part of the object OJ on the basis of the height with respect to the position of the character CH.

The storage device 120 stores various types of information used by the game control device 110.

The operation device 130 collectively shows an operation element, an operation device, and the like included in the game apparatus 10 of the present embodiment.

The display device 140 displays an image in accordance with the control of the game control device 110. Note that a touch panel including the display device 140 may be provided as the operation device 130.

[Example of Process Procedure]

The example of the process procedure executed by the game apparatus 10 of the present embodiment in relation to the display of the game screen will be described with reference to a flowchart of FIG. 9. The process of the figure may be executed, for example, at regular intervals as one of drawing processes of the game screen. In addition, in the following description, in order to simplify the description, a case in which the entire character CH is included in the image change area FL will be described as an example.

During the progress of the game, in the game field GF, the position of the character CH is changed in accordance with the operation by the user. In addition, in the game field GF, the position of the character CH may be changed in accordance with an event or the like generated in the game.

Therefore, the position acquisition device 112 acquires position related information related to a current position of the character CH (step S100). The position related information here includes information indicating the position of the character CH in the plane direction and information indicating the height of the character CH. Here, the position of the character CH in the plane direction is a position of a case in which the reference surface PL is a plane. As an example, in a case in which the reference surface PL is divided by the grid as shown in FIG. 1, the position of the character CH in the plane direction may be represented by coordinates defined in correspondence with each grid. In addition, regarding the height of the character CH, in a case in which the boundary designation surface BD is set as shown in FIGS. 7A and 7B, coordinate in the height direction may be represented stepwise by a multiple of the height H of one block BL. Note that, in the following description, the position of the character CH includes the coordinates in the plane direction and the coordinates in the height direction of the character CH.

The image generation device 113 draws a basic game field screen in accordance with the position of the character CH acquired in step S100 (step S102). The basic game field screen is an image of the game field GF in which a state in which the character CH is not present is drawn. Here, the game field GF may be, for example, a display range determined on the basis of the position of the character CH, or may be a display range (for example, fixed) determined on the basis of other criteria. In the image of the game field GF, all objects OJ that fall within the display range may be disposed.

As a specific example, as shown in FIG. 3, an image of the game field GF in which the objects OJ11 and OJ2 are disposed on the reference surface PL is drawn as the basic game field screen. Alternatively, in FIG. 5, an image excluding the character CH, that is, an image of the game field GF in which the objects OJ21 and OJ22 are disposed on the reference surface PL is drawn as the basic game field screen.

The following steps S104 to S114 are processes related to the drawing of the image change area FL. In drawing the image change area FL, first, the image generation device 113 sets the image change area FL on the game screen on the basis of the position of the character CH acquired in step S100 (step S104). Specifically, in step S104, the image generation device 113 determines a reference position of the image change area FL on the basis of, for example, the position of the character CH. In addition, the image generation device 113 sets a range of a circle centered on the determined reference position as the image change area FL.

Next, the image generation device 113 draws a background image excluding the object OJ in the set image change area FL (step S106). The background image here is an image of the game field GF in a state in which the character CH and the object OJ are not present.

Next, the image generation device 113 determines whether or not there is a portion of the object OJ that becomes a change target (change target object portion) in the image change area FL (step S108). The change target object portion is a portion to be erased in the portion of the object OJ included in the image change area FL.

In the determination in step S108, the image generation device 113 sets the boundary designation surface BD corresponding to the height of the character CH acquired in step S100. In addition, the image generation device 113 determines whether or not there is a portion above the set boundary designation surface BD among the portions of the object OJ included in the image change area FL.

In a case in which there is no portion above the boundary designation surface BD, the image generation device 113 determines that there is no change target object portion. On the other hand, in a case in which there is the portion above the boundary designation surface BD, the image generation device 113 determines that there is the change target object portion. In addition, in accordance with the determination that there is the change target object portion as described above, the image generation device 113 is able to specify the change target object portion.

In a case in which it is determined that there is the change target object portion (step S108-YES), the image generation device 113 executes the following process. That is, the image generation device 113 creates the change object image portion in the image change area FL (step S110). The change object image portion is an image portion of the object OJ remaining after erasing the change target object portion from a prototype of an image portion of the object OJ (prototype object image portion).

Next, the image generation device 113 draws the change object image portion created in step S110 and the image of the character CH in the image change area FL in which the background image is drawn in step S106 (step S112). At this time, for example, the image generation device 113 may perform drawing so as to overlap an image layer from the bottom to the top in correspondence with a depth of a drawing object. That is, the image generation device 113 may first draw the change object image portion at the rear of the character CH, then draw the character CH, and then draw the change object image portion in front of the character CH.

By performing such drawing, as in the image change area FL of FIGS. 4 and 6, in the object OJ disposed in front of the character CH, an image in which a part of the block BL forming the object OJ is erased is obtained.

Note that, in the drawing process of step S112, the drawing may be sequentially performed from the drawing object on the front side in correspondence with the depth (depth) of the drawing object in the three-dimensional virtual space.

Specifically, the image generation device 113 in this case first may performs the drawing from the change object image portion in front of the character CH, then may draw the portion of the character CH that is not hidden by the drawn change object image portion, and then may draw the portion that is not hidden by the character CH in the change object image portion at the rear of the character CH.

In a case of such a drawing process, a process load is reduced because it is not necessary to draw the portion hidden by the front drawing object.

In addition, the drawing method according to the depth of the drawing object as described above may be applied to drawing of the basic game field screen by step S102.

On the other hand, in a case in which it is determined that there is no change target object portion (step S108-NO), the image generation device 113 executes the following process. In this case, it is not necessary to erase any portion of the object OJ included in the image change area FL. That is, in this case, the object OJ to be drawn in the image change area FL may be a prototype object image portion. Therefore, in this case, the image generation device 113 does not have to create the change object image portion from the prototype object image portion.

Therefore, the image generation device 113 in this case draws the prototype object image portion and the image of the character CH in the image change area FL in which the background image is drawn by step S106 without performing the process of step S110 (step S114).

Note that, in a case in which it is determined that there is no change target object portion in step S108 because there is no object OJ in the range of the image change area FL, there is no object OJ to be drawn in step S114. In this case, in step S114, the process of drawing the character CH may be executed without drawing the object OJ.

The image generation device 113 superimposes the image of the image change area FL drawn through the process of step S112 or step S114 on the image of the basic game field screen drawn in step S102 (step S116). Therefore, a display of a state in which the image change area FL is included is performed on the basic game field screen.

Note that the drawing process of the game screen is not limited to the process of superimposing the image of the image change area FL on the image of the basic game field screen as described above. For example, in step S116, instead of superimposing the image of the image change area FL, the image generation device 113 may perform a process of changing (replacing) an image portion of an area where the image change area FL is positioned by the image of the image change area FL on the basic game field screen.

In a case in which the process of step S116 is performed through step S112, the game screen of an aspect shown in FIGS. 4 and 6 is displayed on the display device 140. That is, in the image change area FL, among the blocks BL forming the object OJ positioned in front of the character CH, a game screen of a state in which the block BL of a position higher than the character CH is erased is displayed.

On the other hand, in a case in which the process of step S116 is performed through step S114, a game screen in a state in which the block BL is not particularly erased is displayed in the image change area FL.

Note that according to the example of the process procedure in the figure, the change target object portion is able to be completely erased regardless of which position the change target object portion is positioned in front of or at the rear of the character CH. However, as described above, the change target object portion at the rear of the character CH may not be erased.

In this case, the image generation device 113 may change the process of the figure as described below.

In step S110, the image generation device 113 generates the change object image portion for the object that is present in front of the character CH. On the other hand, in step S110, the image generation device 113 leaves the prototype object image portion as it is without creating the change object image portion for the object that is present at the rear of the character CH. Next, in step S112, the image generation device 113 draws the image portion of the object OJ in the image change area FL. At this time, the image generation device 113 performs the drawing using the prototype object image portion for the object OJ at the rear of the character CH in the image change area FL. On the other hand, the image generation device 113 may draw the portion of the change object image portion created in step S110 for the object OJ in front of the character CH in the image change area FL.

By such a process, the image generation device 113 erases a portion of a height equal to or higher than a predetermined height for the object OJ in front of the character CH in the image change area FL. On the other hand, for the object OJ at the rear of the character CH, the image generation device 113 displays a state in which the object OJ is disposed according to the prototype without erasing the object OJ even in a case in which there is a portion of a height equal to or higher than a predetermined height.

Summary of First Embodiment

As described above, the game apparatus 10 according to the present embodiment includes the position acquisition device 112 and the image generation device 113.

The position acquisition device 112 acquires the information related to the position of the character CH (an example of a second object) that is able to move the game field GF in which the object OJ (an example of a first object) is disposed and is provided in the three-dimensional virtual space.

The image generation device 113 generates the image of the game screen (an example of the image representing the view from the virtual viewpoint in the three-dimensional virtual space). In addition, when the image generation device 113 generates the image, in the image change area FL (an example of the display area including at least a part of the character CH), the image generation device 113 performs the image change for erasing the object OJ on the basis of the height of the object OJ with respect to the position of the character CH.

According to the constitution described above, the portion to be erased for the object OJ is determined in the image change area FL in accordance with the height of the character CH, and the erasure of the determined portion is performed. By such a process, the game apparatus 10 is able to erase the object OJ of a height equal to or higher than a predetermined height in the image change area FL on the basis of the height of the character CH, and may not erase and display the object OJ of a height equal to or lower than the predetermined height. As a result, the game apparatus 10 displays a state of the character that is originally hidden by the object OJ and is not able to be seen, so that the user is able to confirm the state of the character. At the same time, the game apparatus 10 is able to enable the user to ascertain the presence of the object OJ that affects the movement of the character CH.

That is, according to the present embodiment, the game apparatus 10 enables the user to ascertain a positional relationship between the object OJ and the character CH on a state in which the user is enabled to observe the character CH even in a case in which the character CH (an example of a specific object) is blocked by the object OJ (an example of another object) in the three-dimensional virtual space.

Second Embodiment

[Overview]

Figure 10:
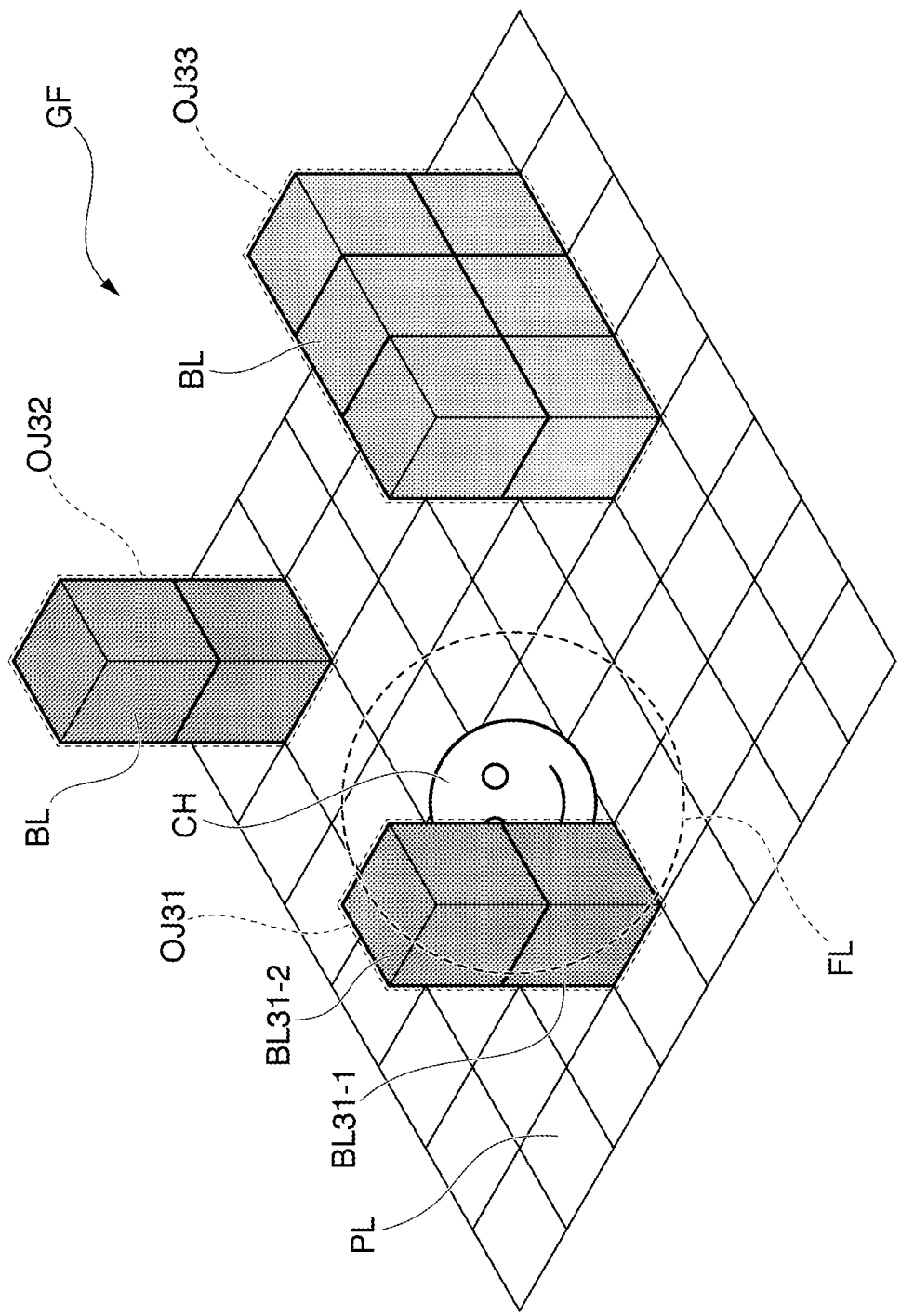
FIG. 10 is a diagram showing an example of the positional relationship between the object and the character in the game field displayed on the game screen.

Subsequently, the second embodiment will be described. The size and the shape of the object OJ disposed in the game field GF may vary. FIG. 10 shows an example of a situation in which an object OJ of a relatively small size is positioned in front of the character CH in a case in which there are variations in the size and the shape of the object OJ.

Three objects OJ31, OJ32, and OJ33 are disposed in the game field GF of the figure. In addition, the character CH is positioned at the rear of the object OJ31 directly on the reference surface PL (the same height as the block BL of the first stage from the bottom). Therefore, the character CH is in a state in which a part of the character CH is blocked by the object OJ31 and is not seen.

Here, the object OJ31 positioned in front of the character CH is formed by a block BL31-1 and a block BL31-2. The block BL31-1 is disposed on the reference surface PL. The block BL31-2 is disposed on the block BL31-1. That is, the object OJ31 has a shape in which two blocks BL are stacked in the height direction, and is small as the size of the object OJ.

Under a state of the figure, for example, in a case in which the boundary setting method shown in FIGS. 7A and 7B is applied as it is, the block BL31-2 disposed above the block BL31-1 becomes a change target of the block BL31-1 and the block BL31-2 forming the object OJ31. That is, in the image change area FL, the lower block BL31-1 is displayed as the object OJ31, but the upper block BL31-2 is erased.

However, since the size of the object OJ31 itself is small, the user is able to ascertain the state of the character CH without erasing the block BL31-2 in many cases. In addition, in a case in which a part of the small object OJ is erased or displayed again in accordance with the movement of the character CH, the user may feel bothersome for the user. When such a thing is considered, depending on the size or the shape of the object OJ, for example, the game apparatus may also not set the portion of the object OJ that becomes the change target by the boundary setting of FIGS. 7A and 7B as the change target.

Therefore, in the present embodiment, the game apparatus divides at least a part of the objects OJ disposed in the game field GF into one that is able to become the change target and one that becomes the change target. In addition, in a case in which at least a part of the object OJ that is able to become the change target is positioned in front of the character CH and falls within in the image change area FL, the game apparatus performs the setting of the boundary determination surface BD of FIGS. 7A and 7B so as to erase the portion of the object OJ above the boundary designation surface BD. On the other hand, in a case in which at least a part of the object OJ that is not become the change target is positioned in front of the character CH and falls within the image change area FL, the game apparatus does not erase the object OJ even though a portion of the object OJ above the boundary designation surface BD is present.

To this end, in the present embodiment, the game apparatus allocates any of an image change allowable position and an image change impossible position to the coordinates (grid) of the reference surface PL.

The image change allowable position is coordinates on the reference surface PL, in which it is permitted that the object OJ or the portion thereof that falls within the image change area FL becomes the change target in a case in which the character CH is positioned at that position.

The image change impossible position is a coordinate on the reference surface PL, in which it is determined that the object OJ or the portion thereof that falls within the image change area FL does not become the change target even though there is the object OJ or the portion thereof that falls within the image change area FL in a case in which the character CH is positioned at that position.

Figure 11:
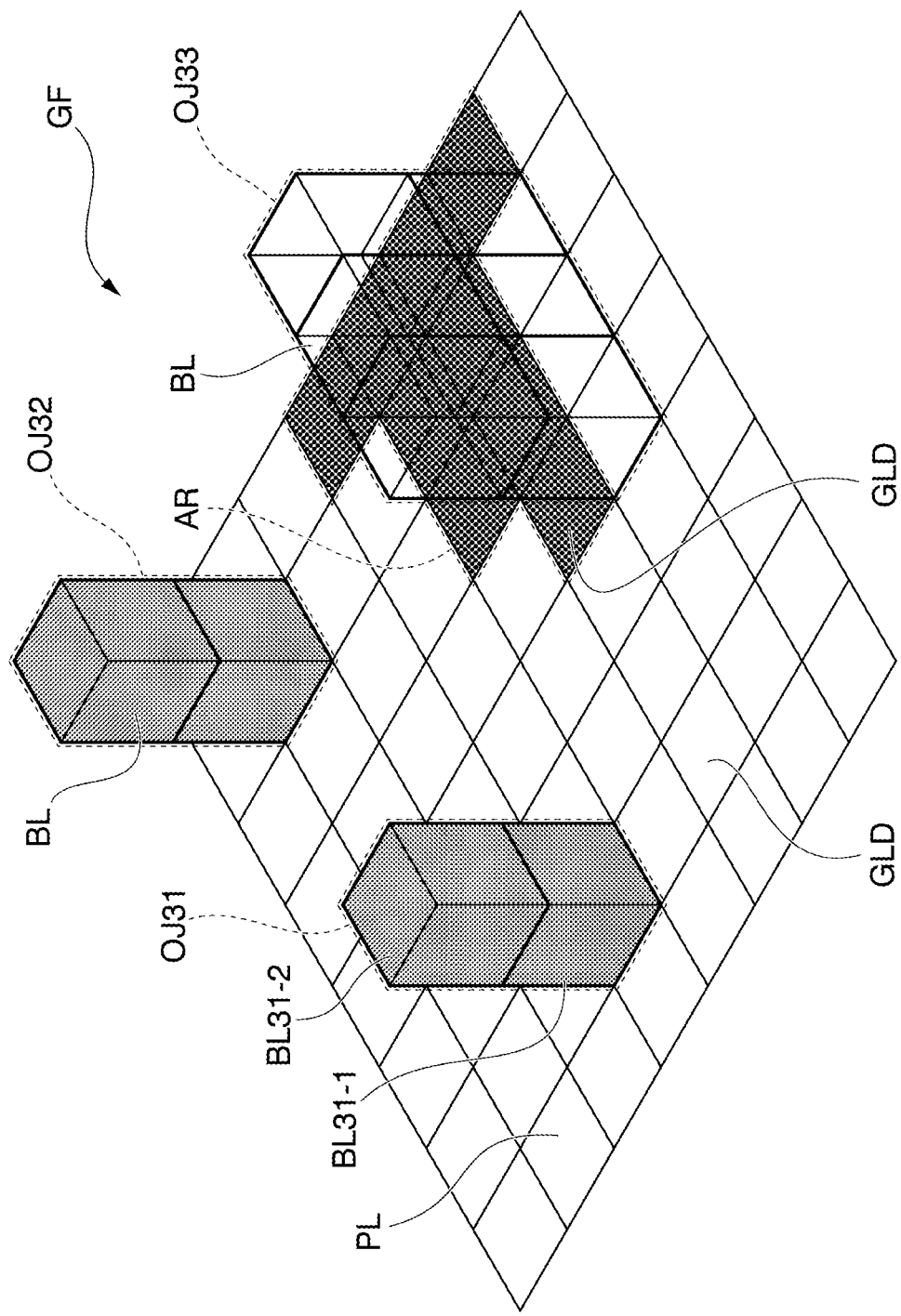
FIG. 11 is a diagram showing an example of setting an image change allowable position and an image change impossible position in a second embodiment.

FIG. 11 shows an example in a case in which the image change allowable position and the image change impossible position are set in the game field GF of FIG. 10. In FIG. 11, in the reference surface PL, each of nine grids GLD included in an image change allowable area AR is set as the image change allowable position. On the other hand, in the reference surface PL, each of the grids GLD included in an area other than the image change allowable area AR is set as the image change impossible position.

In the example of the figure, in a case in which the character CH is positioned in any grid GLD in the image change allowable area AR, the image change is given so that the portion of the block BL of the second stage included in the image change area FL is erased in the object OJ33 that becomes the front of the character CH.

On the other hand, for example, in the game field GF shown in FIG. 10, in a case in which the character CH is present in the grid GLD at the same position as that in FIG. 10, the grid GLD in which the character CH is positioned is the image change impossible position. Therefore, the object OJ31 in front of the character CH is displayed in a complete form by the blocks BL31-1 and BL31-2 without erasing the block BL31-2.

In addition, for example, in the game field GF of FIG. 11, even in a case in which the character CH is positioned at the rear of the object OJ32, the grid GLD in which the character CH is positioned in this case is the image change impossible position. Therefore, the object OJ 32 is also displayed in a complete form without erasing the block BL of an upper side.

Note that, in the above, a case in which the character CH is positioned directly on the reference surface PL is described as an example. However, as shown in FIGS. 5 and 6, the character CH may be present at a position higher than the reference surface PL, such as on the object OJ. In such a case, the setting of the image change allowable position and the image change impossible position may be performed on the upper surface of the block BL forming the object OJ.

[Constitution Example of Game Apparatus]

Figure 12:
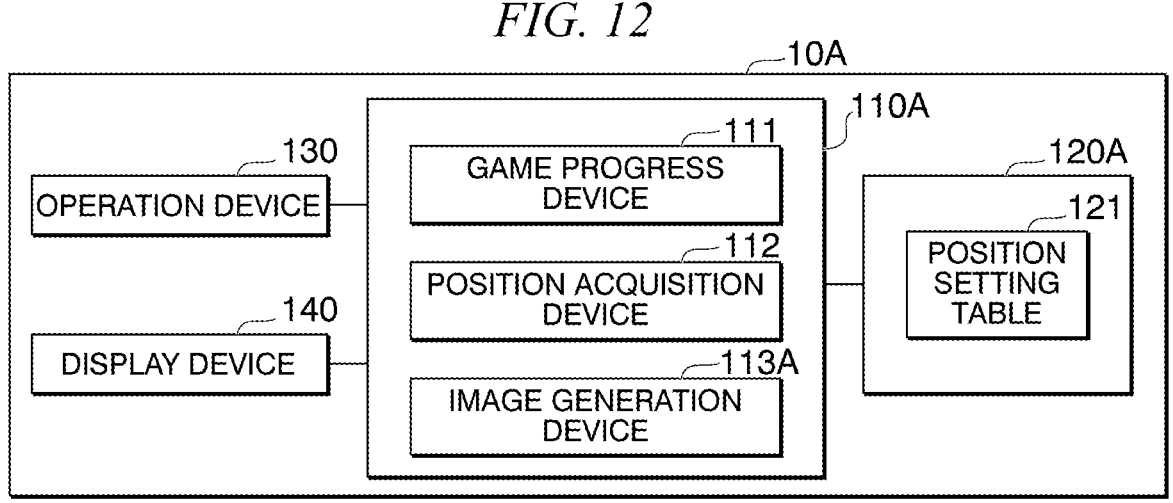
FIG. 12 is a diagram showing a constitution example of a game apparatus in a second embodiment.

FIG. 12 shows the constitution example of the game apparatus 10A in the present embodiment. In the figure, the same reference numerals are denoted to the same parts as in FIG. 8 and descriptions thereof will be omitted.

A game control device 110A in the figure includes at least an image generation device 113A. The image generation device 113A determines whether or not to perform the image change on the basis of the position of the character CH in the game field GF. In addition, in a case in which the character CH is present at a position (image change allowable position) that is determined in advance in the game field GF, the image generation device 113A performs the image change on the basis of the height of the object OJ with respect to the position of the character CH.

In addition, the storage device 120 in the game apparatus 10A stores a position setting table 121. The position setting table 121 is a table indicating whether one or both of the image change allowable position and the image change impossible position are set for each coordinate in the game field GF (the grid of the reference surface PL or the position of the upper surface of the block BL in the object OJ).

[Example of Process Procedure]

The example of the process procedure executed by the game apparatus 10A of the present embodiment in relation to display of the game screen will be described with reference to a flowchart of FIG. 13. Similarly to a case of FIG. 9, a process of FIG. 13 may be executed, for example, at regular intervals as one of the drawing processes of the game screen. In addition, also in the figure, in order to simplify the description, a case in which the entire character CH is included in the image change area FL will be described as an example.

Figure 9:
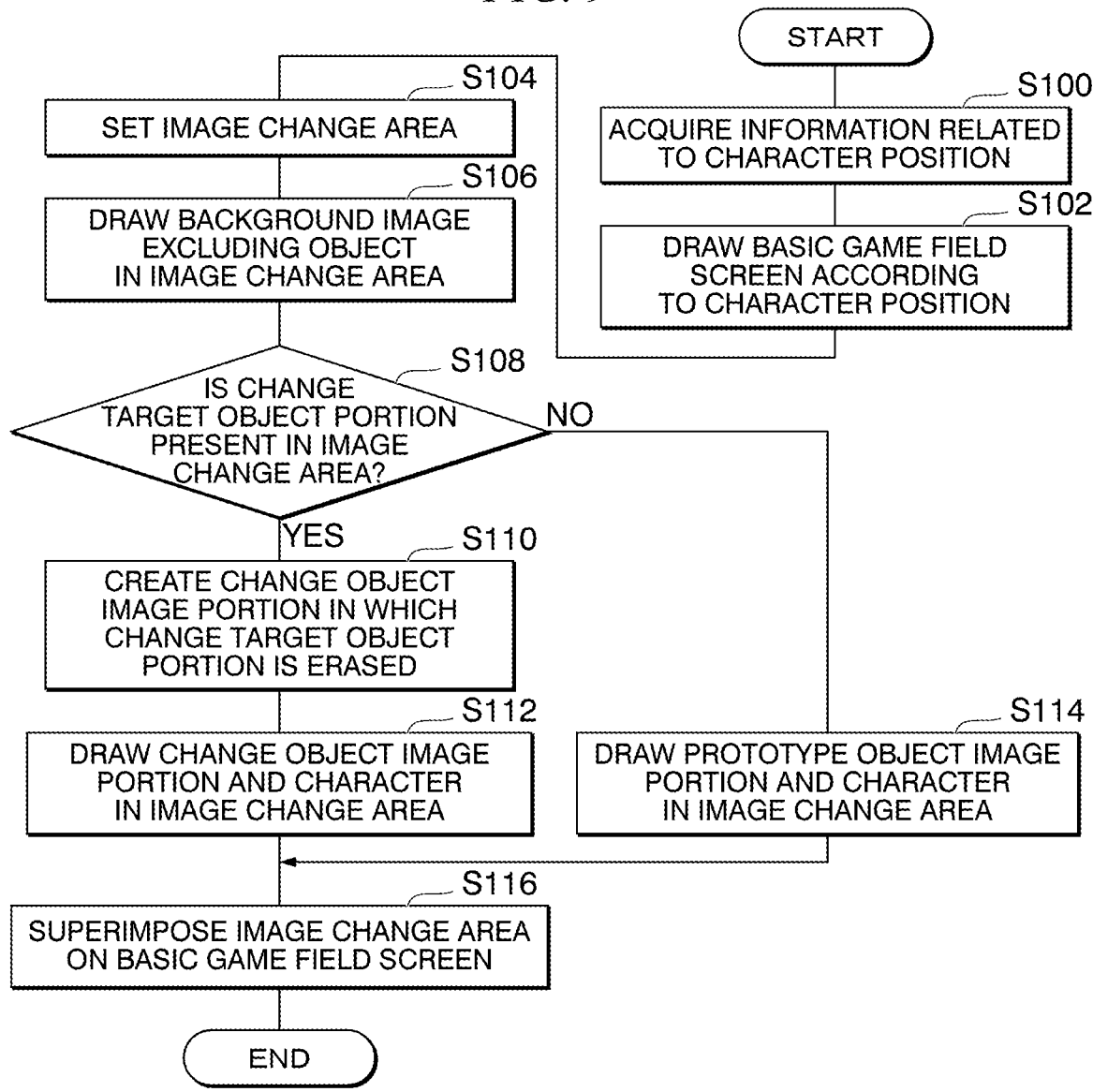
FIG. 9 is a flowchart showing an example of a process procedure executed in relation to display of the game screen by the game apparatus in the first embodiment.

In the figure, a process of step S1100 executed by the position acquisition device 112 and a process of steps S1102 to S1106 executed by the image generation device 113A are similar to the process of steps S100 to S106 of FIG. 9, respectively, and thus description thereof will be omitted.

In step S1106, the image generation device 113A draws a background image in the image change area FL. Thereafter, the image generation device 113A determines whether or not the current position of the character CH is the image change allowable position (step S1108). To this end, the image generation device 113A may determine whether the image change allowable position is set or the image change impossible position is set with respect to the coordinates corresponding to the position of the character CH acquired in step S1100 by referring to the position setting table 121.

In a case in which the position of the character CH is the image change allowable position (step S1108-YES), the object OJ is positioned in front of the character CH, and the object OJ that becomes a target of the image change is included in the image change area FL.

Therefore, the image generation device 113A in this case first specifies the change target object portion of the object OJ in front of the character CH, for example, by the boundary setting method of FIGS. 7A and 7B. In addition, the image generation device 113A executes a process of steps S1110 and S1112. The process of steps S1110 and S1112 are similar to that of steps S110 and S112 of FIG. 9.

On the other hand, in a case in which the position of the character CH is the image change impossible position (step S1108-NO), the image generation device 113 executes a process of step S114 without executing step S1110. The process of step S1114 is similar to that of step S114 of FIG. 9. Note that in a case in which the position of the character CH is the image change impossible position, the object OJ may not be present in the range of the image change area FL. In this case, in step S1114, the image generation device 113 may execute the process of drawing the character CH without drawing the object OJ.

The image generation device 113 superimposes the image of the image change area FL drawn through the process of step S1112 or step S1114 on the image of the basic game field screen drawn in step S1102 similarly to step S116 of FIG. 9 (step S1116).

For example, in correspondence with FIG. 11, a case in which the process of step S1116 is performed through step S1112 corresponds to a case in which the character CH is positioned in any of the grids GLD included in the image change allowable area AR. In this case, among the portions included in the image change area FL, the block BL of the second stage from the bottom in the object OJ33 is erased. A game screen in which the character CH is seen is displayed through the erased portion.

On the other hand, a case in which the process of step S1116 is performed through step S1114 corresponds to, for example, a state in which the character is positioned at the rear of the object OJ31. In this case, the block BL31-2 in the upper stage of the object OJ31 is not erased and completely displayed. In this case, a part of the character CH is blocked by the object OJ31 and is not seen by the user, however, the other part of the character CH is displayed in a state in which the other part of the character CH is seen.

Summary of Second Embodiment

As described above, in the game apparatus 10A of the present embodiment, the image generation device 113A determines whether or not to perform the image change on the basis of the position of the character CH in the game field GF.

According to the constitution described above, it is determined whether or not to perform the image change on the object OJ or the portion thereof on the basis of the position of the character CH in the game field GF. Therefore, for example, even in a case in which an object OJ or a portion thereof of a height, which is able to become the target of the image change is present in the image change area FL, the image change is able to be prevented. Therefore, for example, the game apparatus 10A is able to solve the problem that the user feels bothersome by performing the image change up to the small object OJ or the portion thereof.

In addition, in the game apparatus 10A of the present embodiment, in a case in which the character CH is present at the image change allowable position (an example of a position that is determined in advance), the image generation device 113A performs the image change on the basis of the height of the object OJ to the position of the character CH.

According to the constitution described above, in a case in which the character CH is positioned at the image change allowable position, the game apparatus 10A is able to give the image change to the object OJ in accordance with the height of the character CH. On the other hand, in a case in which the character CH is positioned at the image change impossible position, the game apparatus 10A is able to prevent the image change for the object OJ even in a case in which the object OJ is positioned in front of the character CH. That is, the game apparatus 10A is able to efficiently set whether or not to perform the image change on the object OJ in association with the position (coordinates) in the game field GF.

Modified Example

Hereinafter, the modified example of the present embodiment will be described. The following modified example is able to be applied to at least one of the first embodiment and the second embodiment described above.

First Modified Example

Depending on the positional relationship between the character CH and the object OJ in front of the character CH, the object OJ or a portion thereof included in the image change area FL may be erased in some cases or may not be erased in some cases. In addition, even in a case in which the portion of the object OJ is erased, in a case in which the portion of the object OJ which is erased is small, there is a possibility that it is difficult for the user to confirm that the portion of the object OJ is erased.

In consideration of such a thing, the game apparatus 10 or 10A may enable the user to identify whether or not the object OJ or the portion thereof is erased. Therefore, in the present modified example, the game apparatus 10 or 10A performs a display (object change identification display) for enabling the user to identify whether or not the object OJ or the portion thereof is erased.

Figure 14A:
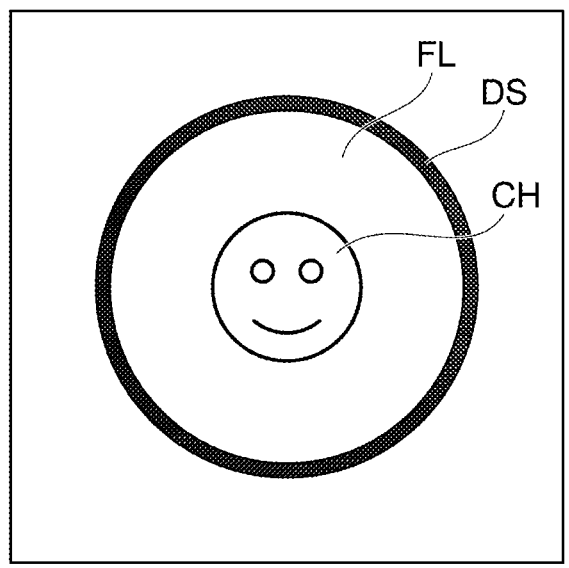
FIG. 14A is a diagram showing an example of an object change identification display in a first modified example.
Figure 14B:
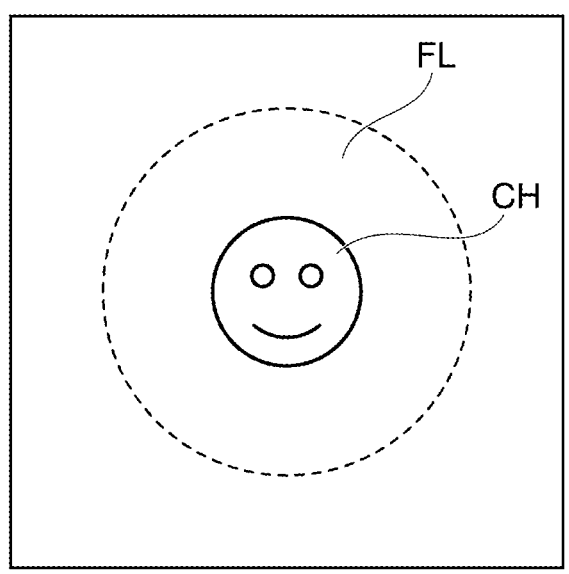
FIG. 14B is a diagram showing another example of the object change identification display in the first modified example.

FIGS. 14A and 14B show an example of one aspect of an object change identification display in the present modified example.

First, FIG. 14A shows an example of a display aspect in a case of a state in which the portion of the object OJ of the change target is erased. In the figure, the image change area FL is shown corresponding to the position of the character CH. The image change area FL is superimposed on the basic game field screen by the game apparatus. In addition, in the figure, a state in which an object change identification display DS is performed is shown. Specifically, in this case, the object change identification display DS is represented by a circumference along an outer shape of the image change area FL. In addition, for example the object change identification display DS is represented by a predetermined color so that the object change identification display DS is able to be clearly distinguished from surroundings visually. In addition, the object change identification display DS in the figure may be displayed by temporally changing a display aspect, and, for example, the object change identification display DS may be displayed to blink.

On the other hand, FIG. 14B shows an example of a display aspect in a case in which the portion of the object OJ of the change target is not erased. In the figure, the image change area FL is indicated by a broken line corresponding to the position of the character CH. The image change area FL is superimposed on the basic game field screen by the game apparatuses 10 and 10A. The broken line indicating the image change area FL in the figure is displayed, for example, at a boundary between the image change area FL and the image of the surrounding basic game field screen. The broken line indicates that the object change identification display DS is not being performed.

As described above, in the present modified example, the game apparatuses 10 and 10A switch the display or non-display of the object change identification display DS in accordance with whether or not the portion of the object OJ of the change target is erased. By such switching of the display, the user is able to clearly ascertain whether or not the portion of the object OJ is erased.

Note that the object change identification display DS is not limited to the aspect in which the display and non-display is switched. For example, the game apparatuses 10 and 10A constantly display an image of the circumference along the outer shape of the image change area FL. In this case, the game apparatuses 10 and 10A may change the gradation, color, or the like of the image of the circumference as the object change identification display DS in accordance with whether or not the object OJ is erased. Alternatively, the game apparatuses 10 and 10A may switch a state in which the image of the circumference is constantly displayed and a state in which the image of the circumference blinks as the object change identification display DS in accordance with whether or not the object OJ is erased. Alternatively, the game apparatuses 10 and 10A may change a blink pattern in accordance with whether or not the object OJ is erased in addition to causing the image of the circumference to blink as the object change identification display DS.

Note that the object change identification display is not limited to the display corresponding to the position of the image change area FL as shown in FIGS. 14A and 14B. For example, the game apparatuses 10 and 10A may perform the object change identification display on a predetermined position away from the image change area FL on the game screen. For example, the game apparatuses 10 and 10A may perform the object change identification display at this predetermined position as display accompanied by characters, a predetermined pattern, or the like.

Figure 13:
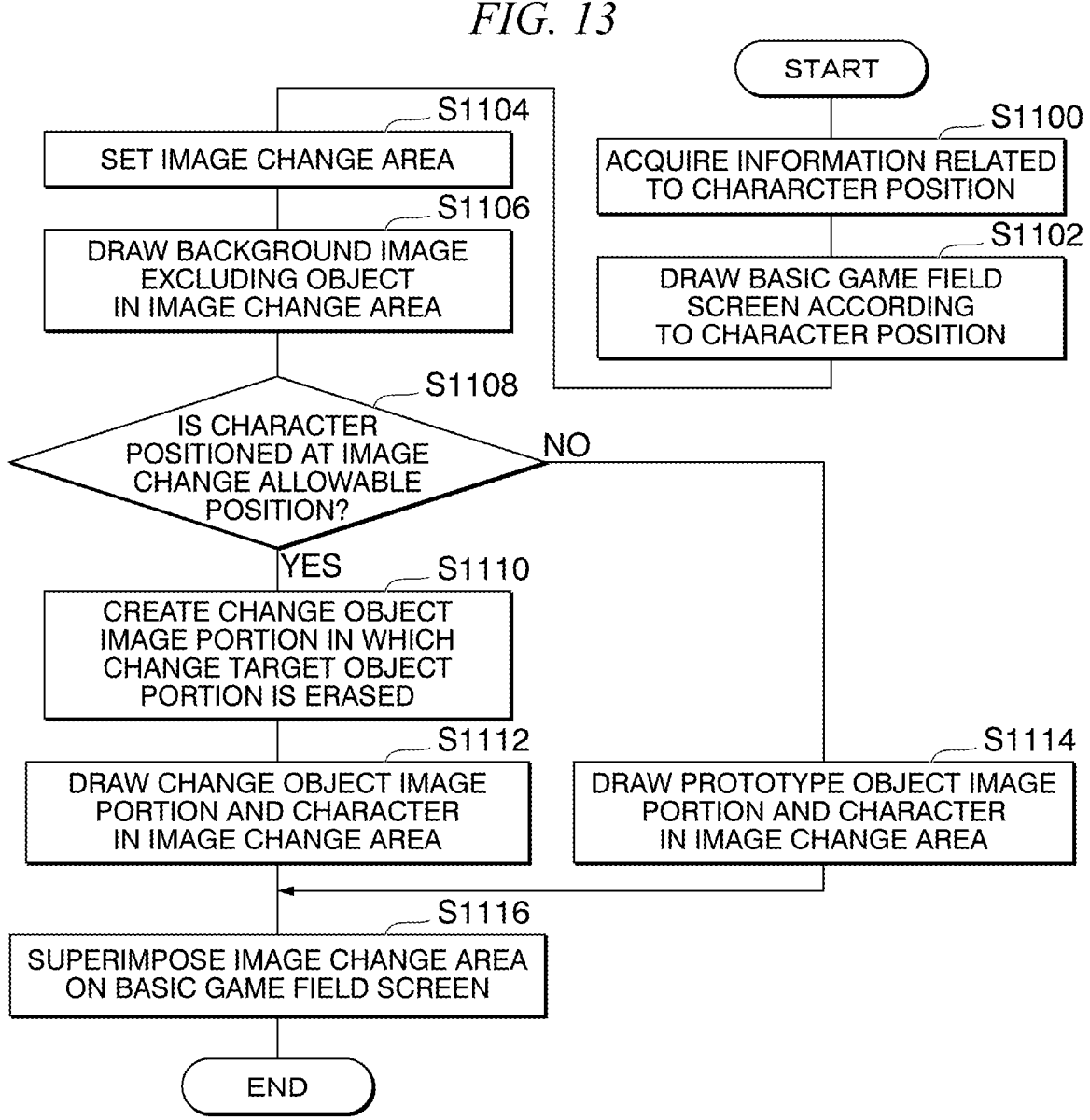
FIG. 13 is a flowchart showing an example of a process procedure executed in relation to the display of the game screen by the game apparatus in the second embodiment.

The display of the object change identification display DS may be realized by performing drawing of the object change identification display DS when the image generation device 113 performs the drawing of the change object image portion and the character at step S112 (FIG. 9) or the image generation device 113A performs the drawing of the change object image portion and the character at step S1112 (FIG. 13). Alternatively, drawing of the object change identification display DS may be realized by performing the drawing of the object change identification display DS when the image generation device 113 superimposes the image of the image change area FL on the image of the basic game field image at step S116 or the image generation device 113A superimposes the image of the image change area FL on the image of the basic game field image at step S1116.

Summary of First Modified Example

As described above, in the game apparatuses 10 and 10A of each of the embodiments described above, the image generation devices 113 and 113A generate the image so that the user is able to identify whether or not the image change is performed in the image change area FL.

According to the constitution described above, in a case in which the image change is performed in the image change area FL, the image generation devices 113 and 113A adds the object change identification display DS of the shape along the outer shape of the image change area FL on the game screen. On the other hand, in a case in which the image change is not performed, the image generation devices 113 and 113A may not add the object change identification display DS. Therefore, the user is able to clearly ascertain whether or not the portion of the object OJ is erased by the presence or absence of the object change identification display DS.

Second Modified Example

In the image change area FL, for example, an upper surface of the object OJ that is not erased and remained (that is, a boundary with the portion of the object OJ, which is erased) is displayed so as to be newly exposed by the erasure of the portion of the object OJ that becomes the change target. Specifically, in correspondence with FIG. 3, in the example in which the image change area FL is displayed as shown in FIG. 4, the display is as follows. That is, in the object OJ11, the display is performed so that upper surface portions of the blocks BL11 to BL13 disposed under the blocks BL21 to BL23 are newly exposed by the erasure of a part or all of the blocks BL21 to BL23.

In consideration of the operability of the user, the game apparatuses 10 and 10A may clearly and visually indicate that the portion in the object OJ newly exposed as described above newly appears by the erasure of the portion of the object OJ of the position higher than the exposed portion.

Therefore, in the present modified example, the game apparatuses 10 and 10A perform display so that the user is able to identify the boundary with the erased portion of the object OJ in the object OJ that is not erased and remained as described above. By performing such a display, the user is able to ascertain where the object OJ has been erased.

Specifically, in the present modified example, the game apparatuses 10 and 10A carry out display (erasure boundary display) representing that a surface that becomes the boundary with the erased portion of the object OJ is the boundary with the erased portion of the object OJ, in the object OJ that is not erased and remained.

Figure 15:
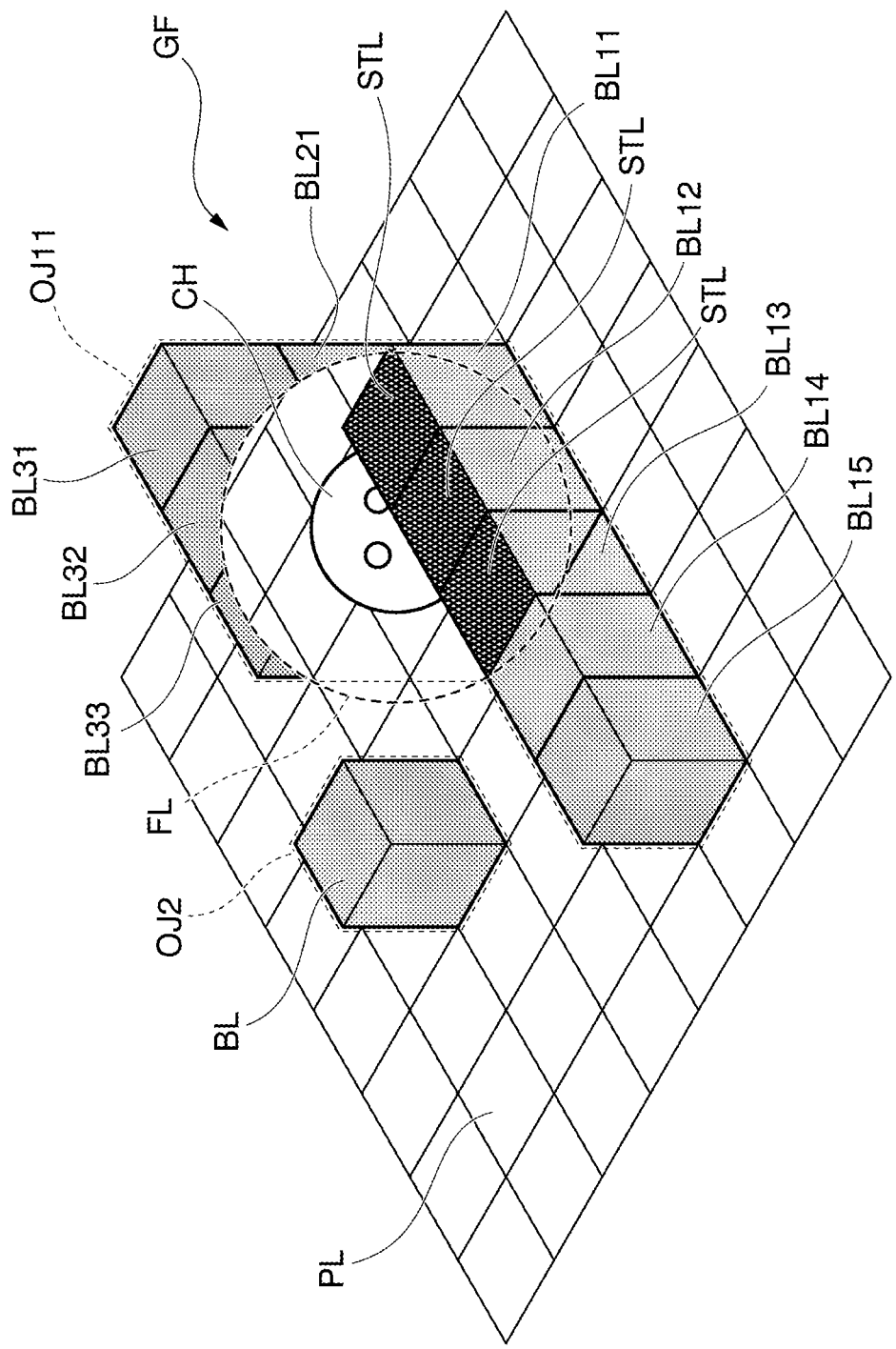
FIG. 15 is a diagram showing an example of an erasure boundary display in a second modified example.

FIG. 15 shows an example in which the erasure boundary display is carried out in a case in which a portion of the same object OJ11 as that in FIG. 4 is erased. In FIG. 15, the game apparatuses 10 and 10A exposes the upper surfaces of the blocks BL11 to BL13 in accordance with the erasure of a portion of the blocks BL21 to BL23 of the object OJ11. FIG. 15 shows a state in which the game apparatuses 10 and 10A carry out an erasure boundary display STL in an upper surface portion of the exposed blocks BL11 to BL13. The user is able to accurately ascertain that the portion of the block BL above the blocks BL11 to BL13 is erased in the object OJ11 by such a display.

Such an erasure boundary display STL is performed when the image generation device 113 creates the change object image portion in step S110 (FIG. 9) or the image generation device 113A creates the change object image portion in step S1110 (FIG. 13). At this time, the image generation devices 113 and 113A are able to be realized by performing drawing corresponding to the erasure boundary display STL for the portion of the predetermined object OJ. Here, the portion of the predetermined object OJ is a portion that is to be exposed in accordance with the erasure of the portion of the object OJ of the change target.

In addition, an aspect of the erasure boundary display STL may be a predetermined pattern or the like regardless of a type of the object OJ, but may be, for example, a pattern according to the object OJ or the type thereof.

As an example, in a case in which the object OJ is a tree, the image generation devices 113 and 113A may perform the erasure boundary display STL such that the tree is cut and an annual ring appears. In addition, in a case in which the object OJ is a building, the image generation devices 113 and 113A may perform the erasure boundary display STL in a state in which the building is cut and an inside is seen.

Summary of Second Modified Example

As described above, in the game apparatuses 10 and 10A of the present embodiment, the image generation devices 113 and 113A generate the image for identifying that the object OJ on which the image change is not performed is the boundary with the object OJ on which the image change is performed.

According to the constitution described above, the game apparatuses 10 and 10A are able to carry out the erasure boundary display STL on the portion that is newly exposed by the erasure of the object OJ, for example, in the object OJ remaining without the image change by the erasure. Therefore, the user is able to accurately ascertain that the portion of the object OJ is erased above the portion on which the erasure boundary display STL is carried out.

Third Modified Example

Subsequently, the third modified example will be described. In the above description, the game apparatuses 10 and 10A have performed the image change by erasing the portion of the object OJ of the change target. However, in the present modified example, an aspect of the image change is not limited to the erasure. For example, the game apparatuses 10 and 10A may perform making translucent (an example of making transparent) as the image change in the image change area FL.

Figure 16:
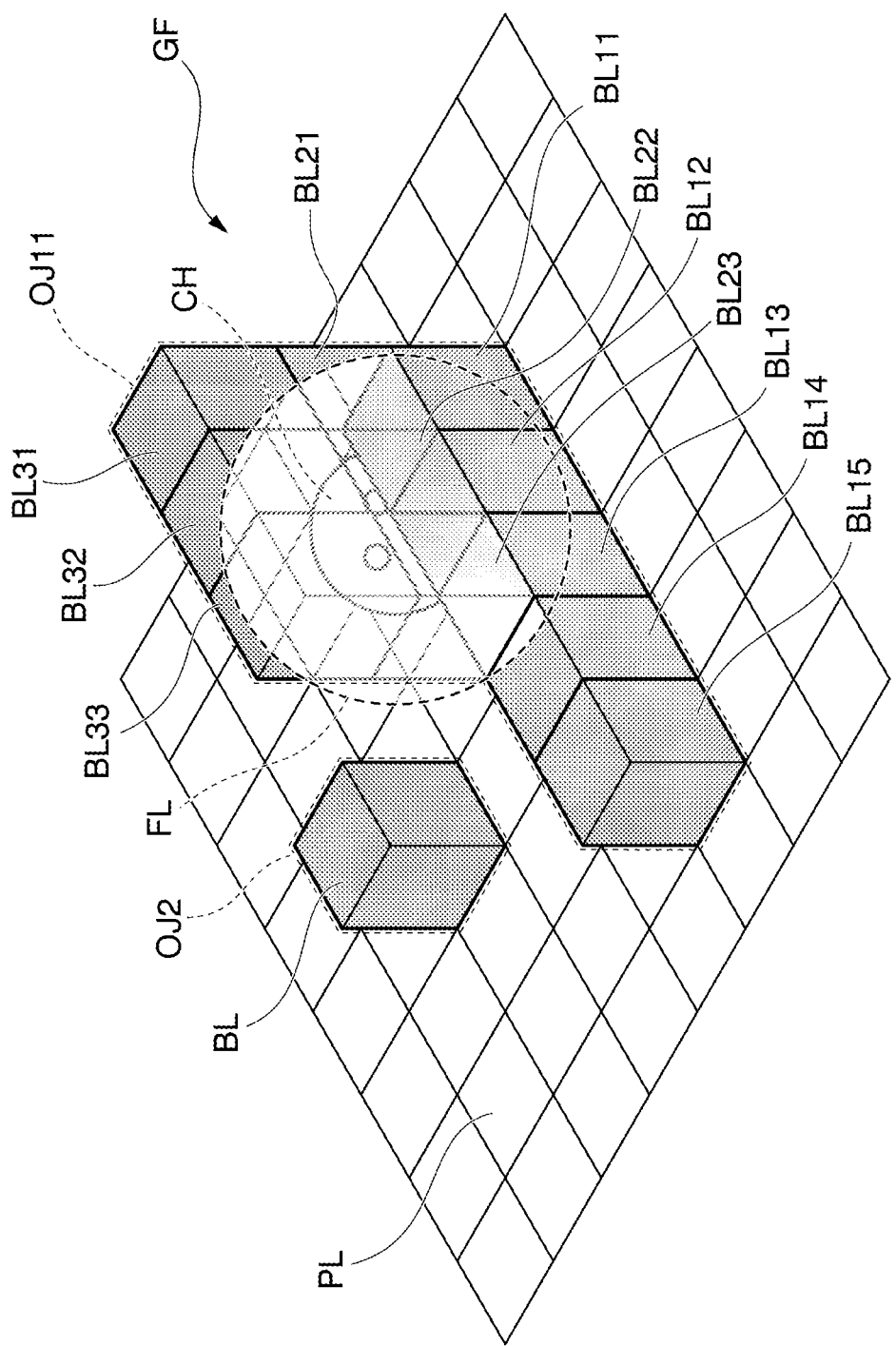
FIG. 16 is a diagram showing an aspect example of the image change in a third modified example.

FIG. 16 shows an example of a case in which the making translucent is performed as the image change in the image change area FL in a case in which the same portion of the object OJ11 (blocks B21 to BL23 and blocks BL31 to BL33) as in FIG. 4 are set as the target of the image change. FIG. 16 shows a state in which the blocks B21 to BL23 and blocks BL31 to BL33 that become the change target are made translucent. In addition, the character CH in this case is displayed in a state in which the character CH is seen through the translucent block BL.

By performing such a display, the user is able to ascertain the state of the character while ascertaining the original shape of the object OJ11.

Such a display of making translucent in the present modified example is able to be realized by performing drawing so that the portion of the object OJ of the change target is made translucent by a predetermined degree of transparentization, when the image generation device 113 creates the change object image portion in step S110 (FIG. 9) or the image generation device 113A creates the change object image portion in step S1110 (FIG. 13).

Summary of Third Modified Example

As described above, in the game apparatuses 10 and 10A of the present embodiment, the image generation devices 113 and 113A perform the image change by making the object OJ transparent.

According to the constitution described above, the game apparatuses 10 and 10A are able to give a change to the image of the object OJ, for example, by setting an arbitrary degree of transparentization in the image change area FL.

In addition, the image generation devices 113 and 113A make the object OJ translucent as the above-described making transparent.

According to the constitution described above, in the image change area FL, the game apparatuses 10 and 10A are able to give a change, for example, to make the image of the object OJ translucent. Therefore, the user is able to confirm the presence of the portion of the object OJ that is the change target together with the character CH.

Fourth Modified Example

Subsequently, the fourth modified example will be described. For example, in the example of FIG. 4, the portion of the character CH blocked by the lowermost blocks BL11 to BL13 that are not erased and remained is not seen. In the example of FIG. 4, the character CH is in a state in which the upper portion seen through the blocks BL11 to BL13 is displayed. In such a display state, the user may not be able to see the entire character CH, and it may be difficult to accurately ascertain the state of the character CH in some cases.

Therefore, in the present modified example, when the image change is given to the object OJ, a predetermined portion of the character CH is displayed by a silhouette. Here, the predetermined portion is a portion of the character CH, which is a portion of the object OJ hidden by a portion on which the erasure by the image change is not performed and is remained.

Figure 17:
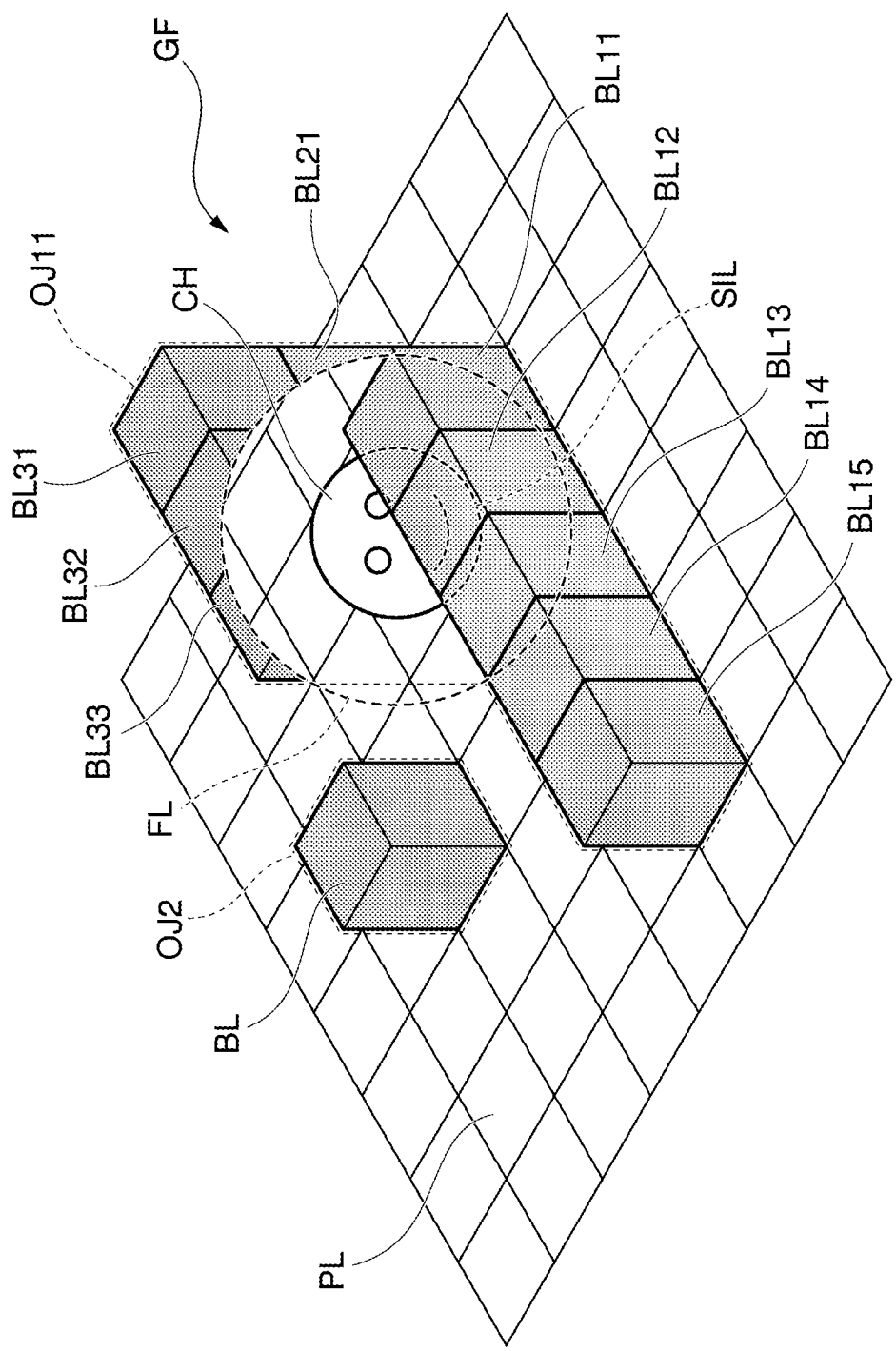
FIG. 17 is a diagram showing a display aspect example of a silhouette of a character in a fourth modified example.

FIG. 17 shows an example in which the predetermined portion of the character CH is displayed by the silhouette SIL in a case in which the same portion of the object OJ11 as in FIG. 4 is erased. That is, in FIG. 17, in the entire character CH, the upper portion seen through the blocks BL11 to BL13 is normally displayed. On the other hand, in the entire character CH, the display by the silhouette SIL is performed on the portion hidden by the blocks BL11 to BL13.

Such a display of the character CH is able to be realized by performing drawing so that the portion of the silhouette SIL of the character CH is superimposed on the change object image portion when the image generation device 113 draws the change object image portion in front of the character CH in step S112 (FIG. 9) or the image generation device 113A draws the change object image portion in front of the character CH in step S1112 (FIG. 13).

Summary of Fourth Modified Example

As described above, in the game apparatuses 10 and 10A of the present embodiment, the image generation devices 113 and 113A superimposes the silhouette SIL of the character CH (an example of the image showing the presence of the character CH) on the image showing the object OJ on which the image change is not performed on the basis of the position of the character CH in the game field GF.

According to the constitution described above, the portion of the character CH hidden in the object OJ remained without image change is displayed in a superimposed state by the silhouette SIL with respect to the object OJ remained without image change.

Therefore, the user is able to recognize the entire image of the character CH, and thus the user is able to accurately ascertain the state of the character CH.

Fifth Modified Example

Subsequently, the fifth modified example will be described.

In the third modified example described above, the game apparatuses 10 and 10A make the portion of the object OJ that is the change target translucent. On the other hand, in the present modified example, the game apparatuses 10 and 10A first make the portion of the object OJ that does not become the change target and is remained translucent by a predetermined degree of transparentization. In addition, the game apparatuses 10 and 10A perform display in which the making translucent is performed by setting the degree of transparentization higher than the degree of transparentization set to the portion that does not become the change target to the portion of the object OJ that becomes the change target in the same object OJ.

Depending on such a display, although illustration is omitted, in the image change area FL, the object OJ including the portion of the change target is displayed translucently. Of the object OJ, the portion of the change target is displayed with higher degree of transparentization than the portion that does not become the change target. By displaying the image change area FL as described above, the user is also able to accurately ascertain the state of the character CH positioned at the rear of the object OJ while accurately ascertaining the presence of the object OJ disposed in front of the character CH.

Such a display of making translucent of the present modified example is realized as the process of creating the change object image portion by the image generation device 113 in step S110 (FIG. 9) or the image generation device 113A in step S1110 (FIG. 13). The image generation devices 113 and 113A are able to realize the process by performing drawing by a predetermined low degree of transparentization for the portion of the object OJ that does not become the change target and performing drawing by a predetermined degree of transparentization higher than that of the portion of the object OJ that does not become the change target for the portion of the object OJ of the change target.

Sixth Modified Example

Under each of the above-described embodiments, the shape of the image change area FL is fixed, for example, by a circle. However, the shape of the image change area FL may change, for example, in accordance with the state of the character CH in the game field GF.

Therefore, as the present modified example, the game apparatuses 10 and 10A change the shape of the image change area FL in accordance with the movement direction of the character CH.

Figure 18:
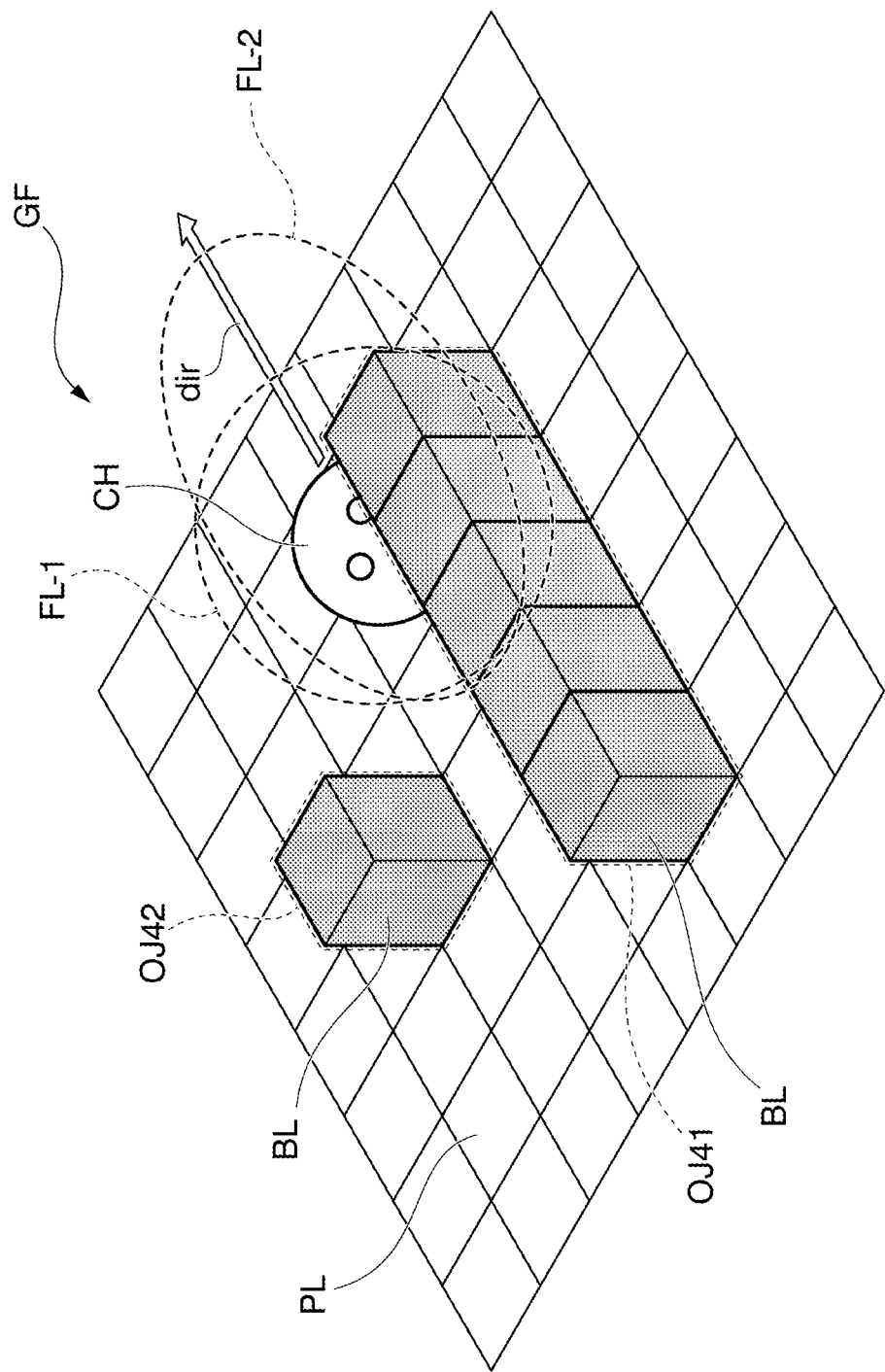
FIG. 18 is a diagram showing an aspect example of a shape change of the image change area in a sixth modified example.

An aspect example of the shape change of the image change area FL in the present modified example will be described with reference to FIG. 18. In the figure, objects OJ41 and OJ42 are disposed in the game field GF. The figure shows a state in which the character CH is moving in a direction indicated by an arrow dir at the rear of the object OJ41.

In the present modified example, in a state in which the character CH is stopped, the image change area FL is a circle of a fixed size. Specifically, in a case in which the character CH is stopped at the position of FIG. 18, the shape of the image change area FL is circular as shown as an image change area FL-1.

On the other hand, in a case in which the character CH is moving, the shape of the image change area FL becomes like an image change area FL-2. That is, the image change area FL-2 is deformed so that an area becomes wider than that of the image change area FL-1 in the movement direction of the character CH. In the figure, an example in which the image change area FL-2 becomes an elliptical shape in accordance with the movement of the character CH is shown.

In addition, in a case in which the image change area FL is deformed, the game apparatuses 10 and 10A set the portion of the object OJ included in the deformed image change area FL as a change target such as erasure or making translucent.

By performing such a display, when the character CH is moving, the area to which the image change of the object OJ is given becomes wider at a movement destination. Therefore, the user is able to easily ascertain a pattern of the movement destination of the character CH.

Such a change in the shape of the image change area FL is able to be realized by the following process in setting the image change area FL by the image generation device 113 in step S104 (FIG. 9) or by the image generation device 113A in step S1104 (FIG. 13).

That is, the image generation devices 113 and 113A determine the reference position of the image change area FL on the game screen on the basis of the position of the character CH as described above. In addition, the image generation devices 113 and 113A determine whether or not the character CH is moving on the basis of the change in the position of the character CH from the present to a past certain time before. Furthermore, in a case in which the character CH is moving, the image generation devices 113 and 113A determine the movement direction of the character CH in the game field GF. Note that the image generation devices 113 and 113A may determine whether or not a character movement operation is currently performed and whether or not the character CH is moving, and may determine the movement direction of the character CH by the movement direction designated by the character movement operation.

When the character CH is not moving but stopped, the image generation devices 113 and 113A set the image change area FL having a circle shape of a predetermined size centered on the reference position. On the other hand, in a case in which the character CH is moving, the image generation devices 113 and 113A set the image change area FL of an ellipse shape corresponding to the movement direction of the character CH. Here, the ellipse shape is an ellipse in which an area corresponding to the movement direction with respect to the reference position is wider than an opposite side to the movement direction.

In addition, for example, the game apparatuses 10 and 10A may change the size of the image change area FL in accordance with a moving speed of the character CH. Specifically, the image generation devices 113 and 113A may performing setting so as to increase the size of the image change area FL as the movement speed of the character CH increases, and for example, may make a major axis of the ellipse longer. Such deformation of the image change area FL may include, for example, an aspect in which a degree of widening the area on a movement direction side is increased in accordance with the movement speed of the character CH.

In a case in which the image change area FL is changed in accordance with the movement speed of the character CH as described above, for example, when the user is moving the character CH fast, the user is able to ascertain the presence of the object OJ that affects the movement of the character CH in a wider range.

Summary of Sixth Modified Example

As described above, in the game apparatuses 10 and 10A of the present embodiment, the image generation devices 113 and 113A change the range of the image change area FL in accordance with the movement of the character CH.

According to the constitution described above, for example, the game apparatuses 10 and 10A are able to change the shape to expand the image change area FL in the direction corresponding to the movement direction of the character CH, or change the size of the image change area FL in accordance with the movement speed. That is, the game apparatuses 10 and 10A are able to deform the image change area FL so as to conform to the movement state of the character CH. Therefore, the user is able to easily ascertain the state of the surrounding object OJ accompanying the movement of the character CH, and the operability improves.

Seventh Modified Example

In the above description, a case in which the virtual viewpoint on the game screen is fixed is described as an example. However, the height of the virtual viewpoint may be changed, for example, in accordance with a situation of the game field GF, the operation of the user, and the like. As described above, in a case in which the height of the virtual viewpoint is able to be changed, a height of the object OJ that enables the character CH to be seen varies in accordance with the height of the virtual viewpoint. This is the same even in a case in which the positional relationship between the character CH and the object OJ positioned in front of the character CH is the same.

Figure 19:
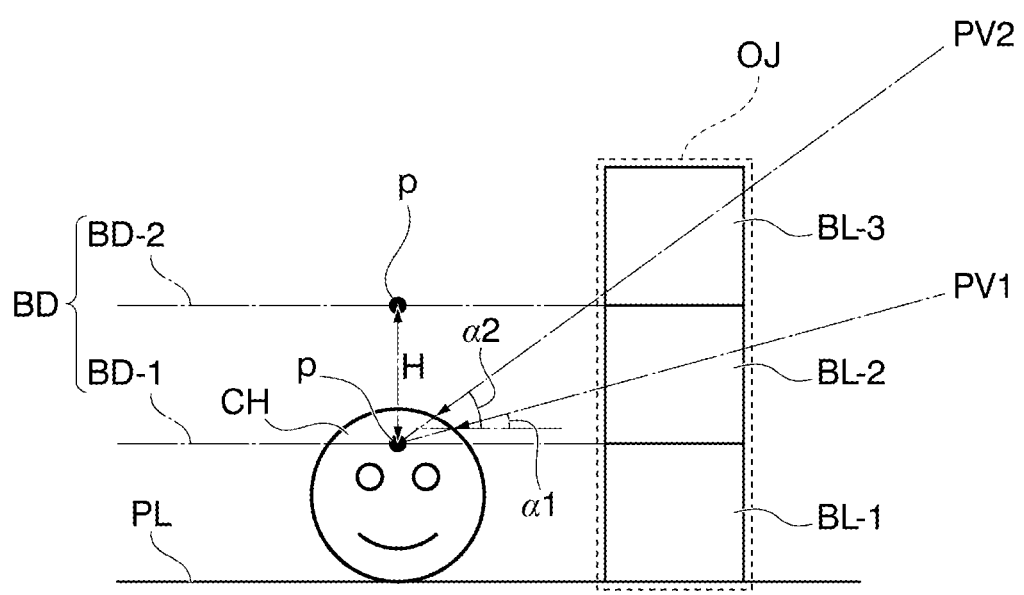
FIG. 19 is a diagram for describing an example of a method of setting the boundary designation surface in accordance with a viewpoint angle in a seventh modified example.

As a specific example, FIG. 19 shows virtual viewpoints PV1 and PV2 having different heights, respectively. As an example, the virtual viewpoints PV1 and PV2 are indicated by a boundary corresponding position p and viewpoint angles α1 and α2, respectively, in the figure. The viewpoint angles α1 and α2 are respectively (minimum values of) angles formed by a surface parallel to the reference surface PL and a line (an example of a line of sight direction) connecting the virtual viewpoints PV1 and PV2 to the boundary corresponding position p.

In the example of the figure, the character CH is positioned directly on the reference surface PL, and the object OJ is disposed in front of the character CH when viewed from the virtual viewpoints PV1 and PV2. The object OJ is formed by stacking blocks BL-1, BL-2, and BL-3 in the height direction.

According to the example of the figure, in a case in which the virtual viewpoint PV1 is set, the game apparatuses 10 and 10A give the image change (erasure or making translucent) to the upper two blocks BL-3 and BL-2 among the blocks BL-1, BL-2, and BL-3 forming the object OJ, and thus the user is able to view the character CH.

On the other hand, in a case in which the virtual viewpoint PV2 higher than the virtual viewpoint PV1 is set, the game apparatuses 10 and 10A give the image change (erasure or making translucent) to the one uppermost block BL-3 among the blocks BL-1, BL-2, and BL-3 forming the object OJ, and thus the user is able to view the character CH.

Therefore, in the present modified example, in addition to the height of the character CH described, for example, in FIGS. 7A and 7B, the game apparatuses 10 and 10A set the boundary designation surface BD on the basis of the position (height) of the virtual viewpoint. Specifically, in a case of FIG. 7, in a case in which the virtual viewpoint PV1 is set, similarly to FIGS. 7A and 7B, the image generation devices 113 and 113A set a plane including the boundary corresponding position p as a boundary designation surface BD-1.

Since the image change is given to the two blocks BL-3 and BL-2 from the top by setting the boundary designation surface BD-1 as described above, the user passes through the block BL-1 from the virtual viewpoint PV1 and sees the character CH from the virtual viewpoint PV1.

On the other hand, in a case in which the virtual viewpoint PV2 is set, the image generation devices 113 and 113A offset the height of one block BL with respect to the boundary corresponding position p. In addition, the image generation devices 113 and 113A set a plane including the boundary corresponding position p after this offset as a boundary designation surface BD-2.

Since the image changed is given to the uppermost block BL-3 by setting the boundary designation surface BD-2 as described above, the user sees the character CH through the block BL-2 of the second stage from the bottom from the virtual viewpoint PV2.

As described above, in order to change the height of the boundary designation surface BD in accordance with the height of the viewpoint, for example, the storage devices 120 and 120A of the game apparatuses 10 and 10A store an offset value table. The offset value table is a table in which an offset value from the boundary corresponding position p is associated with the height for setting the boundary designation surface BD for each predetermined range of the height (viewpoint angle) of the virtual viewpoint. Specifically, in the correspondence with the example of FIG. 19, an offset value of "0" is associated with a range of a viewpoint angle including the viewpoint angle α1, and "H" that is the height of one block BL is associated with a range of a viewpoint angle including the viewpoint angle α2.

In addition, the boundary specification surface BD may be set as follows in specifying the object portion of the change target by the image generation device 113 in step S108 (FIG. 9) or the image generation device 113 in step S1110 (FIG. 13). That is, the image generation devices 113 and 113A acquire a current viewpoint angle, and acquire an offset value corresponding to the current viewpoint angle by referring to the offset value table. The image generation devices 113 and 113A offset the height making the boundary corresponding position p corresponding to the position of the character CH higher by the acquired offset value. The image generation devices 113 and 113A set a plane including the boundary corresponding position p after the offset as the boundary designation surface BD. According to such a process, it is possible to change the height of the boundary between the portion of the object OJ that becomes the change target and the portion of the object OJ that does not become the change target in accordance with the viewpoint angle.

Summary of Seventh Modified Example

As described above, in the game apparatuses 10 and 10A of the present embodiment, the image generation devices 113 and 113A perform the image change further on the basis of the line of sight direction from the virtual viewpoint to the character CH.

According to the constitution described above, the game apparatuses 10 and 10A are able to determine the portion of the object OJ to be the target of the image change in accordance with the height of the virtual viewpoint, and perform the image change of the object OJ. Therefore, in a case in which the height of the virtual viewpoint is changed in the game, the game apparatuses 10 and 10A are able to appropriately perform the image change of the object OJ in accordance with the height of the virtual viewpoint.

Eighth Modified Example

In addition, the image generation devices 113 and 113A determine whether or not the object OJ or a portion thereof is to be the target of the image change. In this determination, the image generation devices 113 and 113A are based on the setting of the boundary designation surface BD determined in accordance with the height of the character CH as shown in FIGS. 7A and 7B. However, the image generation devices 113 and 113A are able to also perform the determination as follows.

That is, in the case in which the character CH tries to move from the current position (the current position) to the direction (the front) where the viewpoint is set in step S108 (FIG. 9), the image generation devices 113 and 113A of the present modified example first determine whether or not there is a portion (movement inhibition portion) of the object OJ of a height disposed to inhibit the movement. In a case in which it is determined that the movement inhibition portion is present, the portion of the object OJ which is not the movement inhibition portion is the change target. Therefore, as step S108, in a case in which it is determined that the movement inhibition portion is present, the image generation devices 113 and 113A further determine whether or not there is a portion of the object OJ that is not the movement inhibition portion in the image change area FL.

In a case in which it is determined that the portion of the object OJ which is not the movement inhibition portion is present, the image generation devices 113 and 113A erase the portion other than the movement inhibition portion in the portion of the object OJ included in the image change area FL in step S110. In addition, the image generation devices 113 and 113A draw the change object image portion so that the movement inhibition portion is not erased and is remained. Also in this case, the image generation devices 113 and 113A are able to display the image change area FL similar to, for example, FIG. 4 or the like.

Note that the movement inhibition portion described above is a portion of the object OJ of a height disposed so as not movable from the current position of the character CH. However, although the movement inhibition portion nay allow the character CH to move even in a case in which the next movement operation is performed, for example, even in a case in which the character CH moves a predetermined distance as it is, the portion of the object OJ at the position where the character CH is not able to move may be included.

Summary of Eighth Modified Example

As described above, in the game apparatus 10 of the present embodiment, the image generation devices 113 and 113A exclude the object OJ of a height that affects the movement of the character CH at the current position from the target of the image change.

According to the constitution described above, in the image change area FL, the image change is not performed on the object OJ of the height that affects the movement of the character CH at the current position. On the other hand, the image change is performed on the object OJ of a height that does not affect the movement of the character CH at the current position. Therefore, the user is able to accurately ascertain the object OJ which becomes an obstacle in a case in which the character CH moves from the current position in the game field GF.

Ninth Modified Example

In addition, in the above description, the boundary designation surface BD is determined in accordance with the height of the character CH as shown in FIGS. 7A and 7B. However, the boundary designation surface BD may be determined on the basis of the height of the object OJ regardless of the height of the character CH. Note that the boundary designation surface BD includes the boundary between the portion of the object OJ that becomes the target of the image change and the object OJ that does not become the target of the image change in the image change area FL.

As an example, the boundary designation surface BD may be fixedly determined as, for example, a boundary between the block BL of the first stage from the bottom and the block of the second stage from the bottom. In this case, among the blocks BL forming the object OJ included in the image change area FL, the block BL of the first stage from the bottom does not become the target of the image change, the portion of the block BL higher than the second stage from the bottom always becomes the target of the image change, and thus the erasure, making translucent, or the like is performed on the portion of the block BL higher than the second stage from the bottom.

In this case, since it is not necessary to set the boundary designation surface BD again in accordance with the movement of the character CH in the height direction, the game apparatuses 10 and 10A are able to reduce the process load.

In addition, the fixed setting of the boundary designation surface BD as in the present modified example may be limitedly applied to the object OJ corresponding to a constant condition, for example, that the height is equal to or less than a constant. On the other hand, in the game field GF which does not correspond to the constant condition, the setting of the boundary designation surface BD may be performed in accordance with the height of the character CH.

Summary of Ninth Modified Example

As described above, the game apparatuses 10 and 10A of the present embodiment include the image generation devices 113 and 113A that generate the image representing the view from the virtual viewpoint in the three-dimensional virtual space having the game field GF in which the character CH is disposed.

The image generation devices 113 and 113A perform the image change by at least one of the erasure and the making translucent of the object OJ in the image change area FL on the basis of the height of the object OJ in the three-dimensional virtual space.

According to the constitution described above, the game apparatuses 10 and 10A are able to determine the object OJ on which the image change is to be performed in accordance with the height of the object OJ itself without considering the height of the character CH. Therefore, since it is not necessary to determine the object OJ on which the image change is to be performed in accordance with the movement of the character CH in the height direction again, the game apparatuses 10 and 10A are able to reduce the process load.

Tenth Modified Example

In the above description, the game apparatuses 10 and 10A perform the erasure or making translucent on the portion of the object OJ that becomes the change target. On the other hand, the game apparatuses 10 and 10A do not perform the erasure or the making translucent on the portion that does not become the change target, or causes the portion that does not become the change target in a state in which the portion that does not become the change target is set to a degree of transparentization lower than that of the portion that becomes the change target.

The difference between the display aspects of the portion that becomes the change target and the portion that does not become the change target in the object OJ performs the following process according to a degree of emphasis of the image. That is, in the image change area FL, the game apparatuses 10 and 10A perform setting so as to increase a degree of emphasizing and displaying the portion that becomes the change target with respect to the portion that does not become the change target, in comparison with the area other than the image change area FL in the game screen.

As the present modified example, the game apparatuses 10 and 10A perform generation of the image so as to obtain the display change similar to those of each of the embodiments described above, with respect to the portion that becomes the change target and the portion that does not become the change target in the object OJ, by using a parameter (image emphasis degree) indicating the degree of emphasis of such an image.

For example, in the case in which the present modified example is applied under the first embodiment, the image generation device 113 sets a standard image emphasis degree corresponding to the normal display to a portion under the boundary designation surface BD and also sets the same standard image emphasis degree to a portion above the boundary designation surface BD, with respect to the object OJ included in the area other than the image change area FL on the game screen. On the other hand, the standard image emphasis degree corresponding to the normal display is set to the portion below the boundary designation surface BD, but an image emphasis degree lower than the standard, which corresponds to the erasure (non-display) is set to the portion above the boundary designation surface BD, with respect to the object OJ included in the area other than the image change area FL.

The image emphasis degree of such a modified example is able to be treated as the degree of transparentization of the image. Therefore, the game apparatuses 10 and 10A are able to set the state of the translucency as in the third modified example in a case in which the game apparatuses 10 and 10A set a higher image emphasis degree corresponding to the erasure to the image emphasis degree lower than the standard, which is set to the portion above the boundary designation surface BD in the image change area FL.

Summary of Tenth Modified Example

As described above, the game apparatuses 10 and 10A of the present embodiment include the position acquisition device 112 and the image generation devices 113 or 113A.

The position acquisition device 112 acquires information related to the position of the character CH (an example of the second object) that is able to move in the game field GF in which the object OJ (an example of the first object) is disposed and in the three-dimensional virtual space.

The image generation device 113 or 113A generates the image of the game screen (an example of the image representing the view from the virtual viewpoint in the three-dimensional virtual space).

In addition, the image generation devices 113 and 113A divide the objects OJ into an object OJ of a high position higher than the boundary designation surface BD (an example of a boundary height) set on the basis of the position of the character CH and an object OJ of a low position lower than the object OJ of the high position. The game apparatuses 10 and 10A set the degree of emphasizing and displaying the object OJ of the low position with respect to the object OJ of the high position in the image change area FL (an example of the first display area) to be higher than the area (an example of the second display area different from the first display area) other than the image change area FL on the game screen.

According to the constitution described above, the game apparatuses 10 and 10A are able to give change so that the object OJ of the target of the image change is erased or made transparent in the image change area FL, by the setting of the image emphasis degree.

Other Modified Examples

Note that, although the shape of the image change area FL is the circle shape or the ellipse shape in the above description, the shape of the image change area FL is not limited to such a shape, and may be, for example, a square shape or the like.

Note that, in the above description, the object of an interest target displayed in the image change area FL is the character CH (operation character) on which the operation is performed by the user. However, the object of the interest target is not limited to the operation character, and may be an object that is present in the three-dimensional virtual space.

For example, in a watching mode or the like, the user may also want to ascertain a situation of a character of an enemy in some cases. In response to such a situation, the game apparatuses 10 and 10A may set the image change area FL using the character of the enemy as a reference and display the character of the enemy in the image change area FL.

In addition, the game supported by the game apparatuses 10 and 10A of the present embodiment is displayed by the virtual viewpoint set in the three-dimensional virtual space, and the content of the game is not particularly limited. In addition, the game screen may be displayed in a state in which the game field is viewed from above obliquely from above, and may be displayed in a state in which the game field is viewed from another direction.

Although the embodiments of the present invention have been described in detail with reference to the drawings, the specific constitution is not limited to the above-described embodiments, and includes design and the like without departing the scope of the present invention. For example, each constitution described in the above-described embodiment is able to be arbitrarily combined.

Note that the process of the game apparatuses 10 and 10A and the like may be performed by recording a program for realizing the functions of the above-described game apparatuses 10 and 10A in a computer-readable recording medium, and causing a computer system to read and execute the program recorded in the recording medium. Here, "causing the computer system to read and execute the programs recorded in the recording medium" includes installing the program in the computer system. The "computer system" referred to here is presumed to include an OS or hardware such as a peripheral device. In addition, the "computer system" may also include a plurality of computer devices that are connected through a network including a communication line such as the Internet, a WAN, a LAN, or a dedicated line. In addition, the "computer-readable recording medium" is a storage device such as a portable medium such as a flexible disk, a magneto-optical disc, a ROM, and a CD-ROM, or a hard disc that is installed inside the computer system. As described above, the recording medium that stores the programs may also be a non-transitory recording medium such as a CD-ROM. In addition, the recording medium also includes an internally or externally provided recording medium that is able to be accessed from a distribution server for distributing the program. A code of the program stored in the recording medium of the distribution server may be different from a code of a program of a format that is executable by a terminal device. That is, it does not matter what format the program stored in the distribution server is in as long as the program is able to be downloaded from the distribution server and installed in a format that is executable by the terminal device. Note that a constitution in which a program is divided into a plurality of programs and the plurality of programs are combined in the terminal device after each of the programs are downloaded at different timing, and the distribution server that distributes each of the divided programs may be different from each other. Furthermore, the "computer readable recording medium" is presumed to also include a recording medium that temporarily stores a program, such as a volatile memory (RAM) inside a computer system that is a server or a client in a case in which the program is transmitted through a network. In addition, the program may also be for realizing a part of the function described above. Furthermore, the function described above may be realized by combining a program that is already recorded in the computer system, and may be a so-called differential file (differential program).

[Note]

From the above description, one aspect of the present invention is able to be grasped, for example, as follows. Note that for ease of understanding the present invention, reference numerals of the attached drawings are added in parentheses for convenience, but one aspect of the present invention is not limited to the shown aspect.

[Note 1]

A game apparatus (10, 10A) according to one aspect of the present invention includes a position acquisition device (112, S100, S1100) configured to acquire information related to a position of a second object (for example, the character CH) movable in a game field in which a first object (for example, the object OJ) is disposed and in a three-dimensional virtual space, and an image generation device (113, 113A) configured to generate an image representing a view from a virtual viewpoint in the three-dimensional virtual space. When the image generation device generates the image, in a display area (for example, the image change area FL) including at least a part of the second object, the image generation device performs an image change by at least one of erasure and transparentization of the first object on the basis of a height of the first object with respect to the position of the second object (S108, S110, S112, S1110, S1112).

According to the constitution described above, the portion to be erased for the first object is determined in accordance with the height of the second object in the display area, and erasure of the determined portion is performed. By such a process, in the display area, on the basis of the height of the second object, the object OJ of a certain height or more is able to be erased, and the object having a certain height or less is able to be displayed without erasure.

As a result, a state of the second object that is hidden by the first object and is not seen is able to be displayed so as to be confirmed, and it is possible to enable the user to ascertain the presence of the first object that affects the movement of the second object. Therefore, in a case in which a specific object (second object) is blocked by another object (first object) in the three-dimensional virtual space, the user is able to ascertain the positional relationship between a specific object and another object after the user is enabled to observe the specific object.

[Note 2]

According to one aspect of the present invention, in the game apparatus described in Note 1 or 2, the image generation device determines whether or not to perform the image change on the basis of the position of the second object in the game field (S1108).

According to the constitution described above, whether or not to perform the image change on the first object is determined on the basis of the position of the second object in the game field. Therefore, for example, depending on the position of the first object, it is possible to prevent the image change even in a case in which there is the first object of the height that is able to be the target of the image change in the display area. Thus, for example, it is possible to solve the problem that the user feels bothersome due to performance of the image change even for the small first object.

[Note 3]

According to one aspect of the present invention, in the game apparatus described in Note 2, in a case in which the second object is present at a position that is determined in advance in the game field, the image generation device performs the image change on the basis of the height of the first object with respect to the position of the second object (S1108, S1110).

According to the constitution described above, in a case in which the second object is positioned at a position that is determined in advance in the game field, it is possible to perform the image change on the first object in accordance with the height of the second object. On the other hand, in a case in which the second object is positioned at a position different from the position that is determined in advance in the game field, it is possible to prevent the performance of the image change on the first object even in a case in which the first object is positioned in front of the second object. That is, it is possible to efficiently set in association with the position (coordinates) in the game field whether or not to perform the image change on the first object.

[Note 4]

According to one aspect of the present invention, in the game apparatus described in any one of appendices 1 to 3, the image generation device generates an image so that whether or not the image change is performed is identifiable in the display area (DS, S112 or S116, S1112 or S1116).

According to the constitution described above, a display indicating whether or not the image change is performed in the display area is performed on the game screen. Therefore, the user is able to clearly ascertain whether or not the portion of the first object or the change target is currently erased.

[Note 5]

According to one aspect of the present invention, in the game apparatus described in any one of appendices 1 to 4, the image generation device generates an image so that a boundary is identifiable between the first object on which the image change is not performed and the first object on which the image change is performed (STL, S110, S1110).

According to the constitution described above, for example, in the first object in which the image change is not performed, the display is performed so that the boundary at which the image change is performed is indicated with respect to the portion that is newly displayed by the image change of the first object. Therefore, the user is able to easily ascertain that there is the portion of the erased first object above the portion where the boundary is marked in the display area.

[Note 6]

According to one aspect of the present invention, in the game apparatus described in any one of appendices 1 to 5, the image generation device makes the first object translucent as the transparentization (S110, S1110).

According to the constitution described above, in the display area, for example, a change is able to be given to make the image of the first object translucent. Therefore, the user is able to confirm the presence of the portion of the first object that becomes the change target together with the second object.

[Note 7]

According to one aspect of the present invention, in the game apparatus described in any one of appendices 1 to 6, the image generation device superimposes an image indicating the presence of the second object on an image indicating the first object on which the image change is not performed on the basis of the position of the second object in the game field (SIL, S112, S1112).

According to the constitution described above, the portion of the second object hidden in the first object that is remained without image change is displayed in a state in which the portion of the second object is superimposed on the first object that is remained without the image change in a predetermined aspect. Therefore, the user is able to recognize the entire image of the second object, and thus the user is able to accurately ascertain the state of the second object.

[Note 8]

According to one aspect of the present invention, in the game apparatus described in any one of appendices 1 to 7, the image generation device changes a range of the display area in accordance with a movement of the second object (FL-2, S104, S1104).

According to the constitution described above, for example, it is possible to change the shape so as to expand the display area in the direction corresponding to the movement direction of the second object, or it is possible to change the size of the display area in accordance with the movement speed. That is, it is possible to deform the display area so as to conform to the movement state of the second object. Therefore, it is easy to ascertain the state of the surrounding first object accompanying the movement of the second object, and the operability is improved.

[Note 9]

According to one aspect of the present invention, in the game apparatus described in any one of appendices 1 to 8, the image generation device further performs the image change on the basis of a line of sight direction from the virtual viewpoint (PV1, VP2) to the second object (S110, S1110).

According to the constitution described above, it is possible to determine the portion of the first object to be the target of the image change in accordance with the height of the virtual viewpoint, and perform the image change of the first object. Therefore, in a case in which the height of the virtual viewpoint is changed in the game, it is possible to appropriately perform the image change of the first object in accordance with the height of the virtual viewpoint.

[Note 10]

According to one aspect of the present invention, in the game apparatus described in any one of appendices 1 to 9, the image generation device performs the image change on the first object of a height that affects the movement of the second object of a current position (S108, S110).

According to the constitution described above, in the display area, the image change is not performed on the first object of a height that affects the movement of the second object at the current position, and the image change is performed on the first object of a height that does not affect the movement of the second object at the current position. Therefore, the user is able to accurately ascertain the first object that affects the movement of the second object from the current position in the game field.

[Note 11]

One aspect of the present invention is a game apparatus including an image generation device configured to generate an image representing a view from a virtual viewpoint in a three-dimensional virtual space having a game field in which a first object is disposed. The image generation device performs an image change by at least one of erasure and transparentization of the first object on the basis of a height of the first object in the three-dimensional virtual space, in a display area including at least a part of the second object movable in a game field.

According to the constitution described above, it is possible to determine the first object on which the image change is to be performed in accordance with the height of the first object itself without considering the height of the second object. Therefore, since it is not necessary to determine the first object on which the image change is to be performed in accordance with the movement of the second object in the height direction again, it is possible to reduce the process load.

[Note 12]

One aspect of the present invention is a game apparatus including a position acquisition device configured to acquire information related to a position of a second object movable in a game field in which a first object is disposed in a three-dimensional virtual space, and an image generation device configured to generate an image representing a view from a virtual viewpoint in the three-dimensional virtual space. The image generation device divides the first object into a first object of a high position higher than a boundary height set on the basis of a position of the second object and a first object of a low position lower than the first object of the high position, and causes a degree of emphasizing and displaying the first object of the low position with respect to the first object of the high position to be higher in a first display area including at least a part of the second object than in a second display area different from the first display area.

According to the constitution described above, it is possible to give change so that the first object of the target of the image change is erased or made transparent in the display area, by the setting of the degree of emphasizing and displaying the object.

[Note 13]

One aspect of the present invention is a program for causing a computer to function as the game apparatus of any one of appendices 1 to 12.

[Note A]

In one aspect of the present invention, an electronic device is constituted by including at least one display screen and at least one computer (computing hardware). Note that the electronic device may not include the screen, and may output the display on an external screen.

The computer is able to instruct executing software (software product). The computer executes software to generate and render a graphical user interface on the screen. The graphical user interface represents one or a plurality of objects (graphical objects) when the graphical user interface is rendered. At least one operation object (for example, a character) of the one or plurality of objects is configured to be movable, operable, or deformable. The operation object is moved, operated, and deformed, by an operation of an input device, by the user, for example, an operation on a touch panel (tap, swipe, and the like), an operation on a controller or an electronic device (button press, impact, acceleration, and the like), an operation on a pointing device such as a mouse (click, drag, and the like). Note that the operation may be performed with a line of sight or a gesture, and the computer may receive an operation input by analyzing an image of the line of sight or the gesture. In addition, the electronic device is, for example, a mobile phone, a tablet, a game apparatus, a goggle, an arcade game machine, a personal computer, a music player, or a server.

Note that, in the embodiment described above, the game apparatus may set each position on the surface of the character CH as a reference position, that is, the surface of the character CH as a set of the reference positions. In this case, the game apparatus sets, for example, an area surrounded by a surface at a certain distance from the surface of the character CH as the image change area FL. In addition, the game apparatus may set a three-dimensional area other than a sphere, such as a cylinder or a prism, as the image change area FL.

In the embodiment described above, "give change of display" means, for example, that a game apparatus (for example, a central processing device or a video card) applies or changes a method of drawing of the target image (for example, an object) (for example, a transparentization process, a process of changing RGB parameters, change of the rendering, a drawing order of layers, or the like) by. The "erasure" or "removal" means, for example, that a game apparatus (for example, a central processing device or a video card) does not perform the drawing of the target image (for example, the object). "Do not erase" or "leave" means, for example, that a game apparatus (for example, a central processing device or a video card) performs the drawing of the target image (for example, the object).

The "operation" is, for example, that the user operates the input device, for example, an operation on the touch panel (tap, swipe, and the like), an operation on the controller or the electronic device (button press, impact, acceleration, and the like), an operation on a pointing device such as a mouse (click, drag, and the like). Note that the operation may be performed with a line of sight or a gesture, and the computer may receive an operation from the user by analyzing an image of the line of sight or the gesture.

In addition, the "portion" is at least a part and may include all. For example, the portion of the block BL is a part of the block BL or the entire block BL.

In addition, regarding "the same height", for example, the lowermost portion may be the same height, or the uppermost portion or the center may be the same height. In addition, "the same height" may be approximately the same height. In addition, the "height" of the object may be one in which a proportion occupied by the object is the largest in a device of height. For example, in the embodiment described above, the height is represented in devices of blocks BL (block height H). For example, in FIG. 7A, since each of the character CH and the block BL-1 has a high proportion of the height occupying the "1" stage, the height is able to also be represented as "1". On the other hand, in FIG. 7B, since each of the character CH and the block BL-2 has a high proportion of the height occupying the "2" stage, the height is also able to be represented as "2".

In addition, the size of the object (for example, the object OJ, the block BL, and the character CH) is, for example, a width, but may be a height or both of the width and the height (area or volume). Here, the width, the height or the area may be the width, the height or the area of at least a part of the object (for example, a minimum value, an extremely minimum value, a maximum value, or an extremely maximum value), or may be a representative value (for example, an average value) derived from a plurality of width, heights or areas. In addition, the width, the height or the area may be a setting value of the object, or may be based on a length as viewed from a virtual viewpoint. The small size (or relatively small size) may be, for example, as small as or smaller than other objects. The small size of the object OJ may be, for example, a small size as compared with the character CH or another object OJ.

In addition, the image change allowable position and the image change impossible position may be one-dimensional or three-dimensional coordinates. In addition, the image change allowable position may be the position of the object OJ which may be the change target, or the portion thereof (for example, the block BL). On the other hand, the image change impossible position may be the position of the object OJ or a portion thereof that does not become the change target.

For example, the game apparatus determines whether or not the object OJ or the portion thereof that fits within the image change area FL is positioned at the image change allowable position, or positioned at the image change impossible position. The game apparatus may erase the object OJ or the portion thereof in a case in which it is determined that the object OJ or the portion thereof is positioned at the image change allowable position or the object OJ or the portion thereof is not positioned at the image change impossible position as a result of the determination. On the other hand, the game apparatus may not erase the object OJ or the portion thereof in a case in which it is determined that the object OJ or the portion thereof is not positioned at the image change allowable position or the object OJ or the portion thereof is positioned at the image change impossible position as the result of the determination. In addition, the image change allowable position and the image change impossible position may be associated with the identifier of the object OJ and the block BL. In addition, the image change allowable position or the image change impossible position may be set on the basis of the size of the image change area FL, or may be changed in accordance with the size of the image change area FL. For example, in a case in which the size of the image change area FL is changed by a user operation, the game apparatus may increase or decrease the image change allowable position or the image change impossible position.

Note that, in the coordinates (grid) of the reference surface PL, "is positioned" or "is located" may mean that a projected image is "located" or "positioned" in a case in which projected onto the reference surface PL in the normal direction of the reference surface PL.

In addition, the drawing process may be executed on the basis of the user operation. For example, the game apparatus may execute the drawing process of FIG. 9 or FIG. 13 in a case in which the user operation is input or in a case in which the character CH moves by the operation.

In addition, the game apparatus may designate an arbitrary position (for example, the center or the top) of an inside of the character CH or a position of an outside (for example, a position above the top by a predetermined height) of the character CH as the boundary corresponding position p. That is, the game apparatus may set a position based on the position of the character CH as the boundary corresponding position p, or may set a surface based on the position of the character CH as the boundary designation surface BD.

One aspect of the present invention is able to be used, for example, in a game apparatus, an integrated circuit, a program, or the like. The game apparatus is a hardware device for operating a computer game. The game apparatus includes, for example, a consumer game machine, a video game machine, a portable game machine, an arcade game machine, an electronic device such as a computer, a server, a mobile phone, or a music player in which an application is installed, a casino machine, and the like.

REFERENCE SIGNS LIST 10, 10A game apparatus, 110, 110A game control device, 111 game progress device, 112 position acquisition device, 113, 113A image generation device, 120, 120A storage device, 121 position setting table, 130 operation device, 140 display device

What is claimed is:
1. A game apparatus comprising:
a position acquisition device configured to acquire information related to a position of a second object movable by an operation of player in a game field having a plurality of blocks in which at least a first object that restricts movement of the second object is disposed, the game field being in a three-dimensional virtual space, the first object formed by stacking one or more first blocks each having a first height from a reference surface; and an image generation device configured to generate an image representing a view from a virtual viewpoint in the three-dimensional virtual space;
wherein, when the image generation device generates the image, the image generation device performs an image change in an image change area surrounding the second object,
wherein the image change area includes the second object and additional area surrounding the second object,
wherein the image generation device determines a boundary plane parallel to the reference surface based on one or more of the first height of each of the plurality of blocks,
wherein the boundary plane is at a first distance, which is the first height from the reference surface in case the second object is on the reference surface,
wherein the boundary plane is at a second distance, which is calculated based on a sum of two or more of the first height from the reference surface in case the second object is on one or more of second blocks among the plurality of blocks,
wherein the image generation device sets a boundary height and a position on the second object, based on the boundary plane that is determined, so that the boundary plane that is determined is at the boundary height, and the position on the second object is at the boundary height,
wherein the image change area is movable together with the second object,
wherein performing the image change comprises performing one of erasure and transparentization of a first portion of the first object within the image change area and displaying a second portion of the first object within the image change area based on a height of the first object with respect to the position on the second object,
wherein the transparentization makes the first portion, which is an upper portion of the first object to be greater in transparency than a lower portion, which is the second portion of the first object, and
wherein the upper portion includes one or more of the first blocks that is positioned above the boundary height, and the lower portion includes one or more of the first blocks that is positioned below the boundary height, and covers a portion of the second object.

2. The game apparatus of claim 1, wherein the image generation device determines whether or not to perform the image change based on the position of the second object in the game field.

3. The game apparatus of claim 1, wherein, in a case in which the second object is present at a position that is determined in advance in the game field, the image generation device performs the image change based on the height of the first object with respect to the position of the second object.

4. The game apparatus of claim 1, wherein the image generation device generates an image so that whether or not the image change is performed is identifiable in a display area.

5. The game apparatus of claim 1, wherein the image generation device generates an image so that a boundary is identifiable between the first object on which the image change is not performed and the first object on which the image change is performed.

6. The game apparatus of claim 1, wherein the image generation device makes the first object translucent as the transparentization.

7. The game apparatus of claim 1, wherein the image generation device superimposes an image indicating the presence of the second object on an image indicating the first object on which the image change is not performed based on the position of the second object in the game field.

8. The game apparatus of claim 1, wherein the image generation device changes a range of a display area in accordance with a movement of the second object.

9. The game apparatus of claim 1, wherein the image generation device further performs the image change based on a line of sight direction from the virtual viewpoint to the second object.

10. The game apparatus of claim 1, wherein the image generation device performs the image change on the first object of a height that affects the movement of the second object of a current position.

11. A game apparatus comprising:
an image generation device configured to generate an image representing a view from a virtual viewpoint in a three-dimensional virtual space having a game field having a plurality of blocks in which at least a first object is disposed that restricts movement of the second object the first object formed by stacking one or more first blocks each having a first height from a reference surface;
wherein the image generation device performs an image change in an image change area surrounding the second object,
wherein the image change area includes the second object and additional area surrounding the second object,
wherein the image change area is movable together with the second object, and
wherein performing the image change comprises performing one of erasure and transparentization of a first portion of the first object within the image change area and displaying a second portion of the first object within the image change area based on a height of the first object in the three-dimensional virtual space, in a display area including at least a part of a second object movable by an operation of player in the game field,
wherein the image generation device determines a boundary plane parallel to the reference surface based on one or more of the first height of each of the plurality of blocks,
wherein the boundary plane is at a first distance, which is the first height from the reference surface in case the second object is on the reference surface,
wherein the boundary plane is at a second distance, which is calculated based on a sum of two or more of the first height from the reference surface in case the second object is on one or more of second blocks among the plurality of blocks,
wherein the image generation device sets a boundary height and a position on the second object, based on the boundary plane that is determined, so that the boundary plane that is determined is at the boundary height, and the position on the second object is at the boundary height,
wherein the transparentization makes the first portion, which is an upper portion of the first object to be greater in transparency than a lower portion, which is the second portion of the first object, and
where the upper portion includes one or more of the first blocks that is positioned above the boundary height, and the lower portion includes one or more of the first blocks that is positioned below the boundary height and covers a portion of the second object.

12. A game apparatus comprising:
a position acquisition device configured to acquire information related to a position of a second object movable by an operation of player in a game field having a plurality of blocks in which at least a first object that restricts movement of the second object is disposed, the game field being in a three-dimensional virtual space, the first object formed by stacking one or more first blocks each having a first height from a reference surface; and
an image generation device configured to generate an image representing a view from a virtual viewpoint in the three-dimensional virtual space in an image change area surrounding the second object;
wherein the image change area includes the second object and additional area surrounding the second object,
wherein the image change area is movable together with the second object, and
wherein the image generation device:
divides the first object into a high position first object region that is higher than a boundary height set based of a position of the second object and a low position first object region that is lower than the high position first object region,
performing one of erasure and transparentization of a first portion of the first object within the image change area based on the high position first object region; and
displays a second portion of the first object within the image change area based on low position first object region,
wherein the image generation device determines a boundary plane parallel to the reference surface based on one or more of the first height of each of the plurality of blocks,
wherein the boundary plane is at a first distance, which is the first height from the reference surface in case the second object is on the reference surface,
wherein the boundary plane is at a second distance, which is calculated based on a sum of two or more of the first height from the reference surface in case the second object is on one or more of second blocks among the plurality of blocks,
wherein the image generation device sets a boundary height and a position on the second object, based on the boundary plane that is determined, so that the boundary plane that is determined is at the boundary height, and the position on the second object is at the boundary height,
wherein the transparentization makes the high position of the first object region, which is an upper portion of the first object to be greater in transparency than a lower portion, which is the low position first object region of the first object, and
where the upper portion includes one or more of the first blocks that is positioned above the boundary height, and the lower portion includes one or more of the first blocks that is positioned below the boundary height and covers a portion of the second object.

13. A non-transitory computer-readable storage medium that stores computer-executable program for causing a computer to function as a game apparatus comprising:
a position acquisition device configured to acquire information related to a position of a second object movable by an operation of player in a game field having a plurality of blocks in which at least a first object that restricts movement of the second object is disposed, the game field being in a three-dimensional virtual space, the first object formed by stacking one or more first blocks each having a first height from a reference surface; and an image generation device configured to generate an image representing a view from a virtual viewpoint in the three-dimensional virtual space;

wherein, when the image generation device generates the image, the image generation device performs an image change in an image change area surrounding the second object, wherein the image change area includes the second object and additional area surrounding the second object, wherein the image change area is movable together with the second object, and wherein performing the image change comprises performing one of erasure and transparentization of a first portion of the first object within the image change area and displaying a second portion of the first object within the image change area based on a height of the first object with respect to the position of the second object, wherein the image generation device determines a boundary plane parallel to the reference surface based on one or more of the first height of each of the plurality of blocks, wherein the boundary plane is at a first distance, which is the first height from the reference surface in case the second object is on the reference surface, wherein the boundary plane is at a second distance, which is calculated based on a sum of two or more of the first height from the reference surface in case the second object is on one or more of second blocks among the plurality of blocks, wherein the image generation device sets a boundary height and a position on the second object, based on the boundary plane that is determined, so that the boundary plane that is determined is at the boundary height, and the position on the second object is at the boundary height, wherein the transparentization makes the first portion, which is an upper portion of the first object to be greater in transparency than a lower portion, which is the second portion of the first object, and where the upper portion includes one or more of the first blocks that is positioned above the boundary height, and the lower portion includes one or more of the first blocks that is positioned below the boundary height and covers a portion of the second object.

14. A game apparatus comprising:

a position acquisition device configured to acquire information related to a position of a second object movable by an operation of player in a game field having a plurality of blocks in which at least a first object that restricts movement of the second object is disposed, the game field being in a three dimensional virtual space, the first object formed by stacking one or more first blocks each having a first height from a reference surface; and an image generation device configured to generate an image representing a view from a virtual viewpoint in the three-dimensional virtual space;

wherein, when the image generation device generates the image, the image generation device performs an image change in an image change area surrounding the second object, wherein the image change area includes the second object and additional area surrounding the second object, wherein the image change area is movable together with the second object, wherein the image generation device determines a boundary plane parallel to the reference surface based on one or more of the first height of each of the plurality of blocks, wherein the boundary plane is at a first distance, which is the first height from the reference surface in case the second object is on the reference surface, wherein the boundary plane is at a second distance, which is calculated based on a sum of two or more of the first height from the reference surface in case the second object is on one or more of second blocks among the plurality of blocks, and wherein performing the image change comprises erasing a first portion of the first object within the image change area and displaying a second portion of the first object within the image change area based on a height of the first object with respect to the position on the second object, and the second portion of the first object is in the game field, the first object is erased of any portion which extend over the first portion.

* * * * *